(12) United States Patent
Cook

(10) Patent No.: US 11,997,363 B2
(45) Date of Patent: May 28, 2024

(54) REGENERATIVE ACTIVE DISTRIBUTED NETWORKS

(71) Applicant: Charter Communications Operating, LLC, St. Louis, MO (US)

(72) Inventor: Charles Cook, Castle Rock, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/230,972

(22) Filed: Apr. 14, 2021

(65) Prior Publication Data
US 2022/0337917 A1  Oct. 20, 2022

(51) Int. Cl.
*H04N 21/61* (2011.01)
*H04J 1/08* (2006.01)
(Continued)

(52) U.S. Cl.
CPC ............ *H04N 21/6118* (2013.01); *H04J 1/08* (2013.01); *H04L 5/0007* (2013.01); *H04L 5/006* (2013.01);
(Continued)

(58) Field of Classification Search
CPC ........... H04N 21/6118; H04N 21/6168; H04N 21/6338; H04J 1/08; H04J 1/12;
(Continued)

(56) References Cited

U.S. PATENT DOCUMENTS

| | | | | |
|---|---|---|---|---|
| 2,374,567 A | * | 4/1945 | Taylor | H04J 1/045 370/481 |
| 5,896,304 A | * | 4/1999 | Tiemann | G01S 19/37 375/E1.031 |

(Continued)

FOREIGN PATENT DOCUMENTS

| | | |
|---|---|---|
| CN | 102577181 A | 7/2012 |
| WO | WO-2020112231 A1 * | 6/2020 |

OTHER PUBLICATIONS

Zhu, Zuqing, and Yonggang Wen. "Architecting Green Broadband Cable Access Network: Energy-Delay Trade-off." Proe. IEEE (2011), (3 pages).

(Continued)

*Primary Examiner* — Stephen J Clawson
(74) *Attorney, Agent, or Firm* — Otterstedt & Kammer PLLC

(57) ABSTRACT

A mapping engine is configured to rearrange a configuration of data on a plurality of data channels. Each of a set of upstream filters is configured to pass one or more selected input radio frequency signals. An input of each of a set of upstream demodulators is configurable to be coupled to a selected one of the upstream filters and an output of each upstream demodulator is coupled to the mapping engine. An input of each of a set of upstream modulators is coupled to the mapping engine. An upstream aggregator comprises one or more inputs and is configured to aggregate a plurality of upstream-bound radio frequency signals, each input being configurable to be coupled to at least one selected upstream (Continued)

filter of the set of upstream filters and a selected upstream modulator.

23 Claims, 14 Drawing Sheets

(51) Int. Cl.
*H04L 5/00* (2006.01)
*H04L 12/28* (2006.01)
*H04N 21/6338* (2011.01)
*H04J 1/12* (2006.01)
*H04J 1/18* (2006.01)

(52) U.S. Cl.
CPC ...... *H04L 12/2801* (2013.01); *H04L 12/2861* (2013.01); *H04N 21/6168* (2013.01); *H04N 21/6338* (2013.01); *H04J 1/12* (2013.01); *H04J 1/18* (2013.01)

(58) Field of Classification Search
CPC .......... H04J 1/18; H04L 5/0007; H04L 5/006; H04L 12/2801; H04L 12/2861
See application file for complete search history.

(56) References Cited

U.S. PATENT DOCUMENTS

| | | | | |
|---|---|---|---|---|
| 6,072,804 | A * | 6/2000 | Beyers, Jr. .......... | H04L 61/2038 370/461 |
| 6,598,232 | B1 | 7/2003 | McAlear | |
| 6,650,630 | B1 * | 11/2003 | Haartsen ........... | H04W 72/0446 455/67.11 |
| 6,741,579 | B1 * | 5/2004 | Choi .................... | H04B 7/2643 370/347 |
| 7,061,929 | B1 * | 6/2006 | Eberle .................. | H04L 47/125 370/423 |
| 7,349,430 | B1 * | 3/2008 | Chapman ............ | H04L 12/2801 370/468 |
| 7,792,963 | B2 | 9/2010 | Gould et al. | |
| 11,122,339 | B1 | 9/2021 | Cook | |
| 2003/0056217 | A1 | 3/2003 | Brooks | |
| 2004/0174812 | A1 | 9/2004 | Murakami | |
| 2005/0040888 | A1 * | 2/2005 | Blodgett ............... | H03F 1/3235 330/149 |
| 2006/0130107 | A1 | 6/2006 | Gonder et al. | |
| 2007/0217436 | A1 | 9/2007 | Markley et al. | |
| 2009/0248794 | A1 | 10/2009 | Helms et al. | |
| 2010/0177717 | A1 * | 7/2010 | Sung .................... | H04W 72/23 370/329 |
| 2010/0313236 | A1 | 12/2010 | Straub | |
| 2013/0128723 | A1 * | 5/2013 | Thibeault ............ | H04L 12/2801 370/216 |
| 2015/0087323 | A1 * | 3/2015 | Srikanteswara ...... | H04W 16/04 455/452.1 |
| 2017/0135052 | A1 | 5/2017 | Lei | |
| 2018/0317212 | A1 | 11/2018 | Kazmi | |
| 2020/0092882 | A1 * | 3/2020 | Kato ................. | H04W 72/0453 |

OTHER PUBLICATIONS

Wikimedia Foundation. (Nov. 21, 2020). Analogue filter. Wikipedia. Retrieved Mar. 1, 2021, from https://en.wikipedia.org/wiki/Analogue_filter, (pp. 1-19).
Broadband Primer, A Guide to High Speed Internet Technologies. Indiana Office of Utility Consumer Counselor. (2006). Indianapolis, IN., (pp. 1-7).
Cable front ends. MaxLinear. (n.d.). Retrieved Jul. 29, 2020, from https://www.maxlinear.com/products/connected-home/cable-broadband/cable-modem-front-ends, (1 page).
Cable Broadband. MaxLinear. (n.d.). https://www.maxlinear.com/products/connected-home/cable-broadband, Retrieved Jul. 29, 2020, (1 page).
News Wire Feed Light Reading. Jul. 21, 2005, Huawei, Ike Elliott, C. E. O. P., James Crawshaw, p. A., Nadine Manjaro, D. T. I. T. I. C., & J. David Grossman, V. P. of R. A. (n.d.). CIP launches photonic 2R regenerator. Light Reading. Retrieved Jul. 21, 2020, from https://www.lightreading.com/cip-launches-photonic-2r-regenerator/d/d-id/616041, (pp. 1-6).
FSC® Narrowband Tuners/demods. MaxLinear. (n.d.). Retrieved Jul. 29, 2020, from https://www.maxlinear.com/products/access/other/fsc-and-narrowband-tuners-demods, (1 page).
Wikimedia Foundation. (Jan. 24, 2021). Digital Filter. Wikipedia. Retrieved Mar. 1, 2021, from https://en.wikipedia.org/wiki/Digital_filter, (pp. 1-10).
Energy-efficient Translucent Optical Transport Networks with Mixed Regenerator Placement. Journal of Lightwave Technology, vol. 30, No. 19, Oct. 1, 2012 (pp. 1-11) (n.d.). Retrieved Apr. 7, 2022, from https://www.researchgate.net/profile/Xiaoliang-Chen-4/publication/258665185_Energy-Efficient_Translucent_Optical_Transport_Networks_With_Mixed_Regenerator_Placement/.
Lightbit Intros Optical Regenerator. Light Reading. Retrieved Jul. 21, 2020, from hhttps://www.lightreading.com/mobile/lightbit-intros-optical-regenerator/ (pp. 1-5).
Optelian RGN: Optical transponder/regenerator from mhz. MHz. Retrieved Jul. 21, 2020, from https://go2mhz.com/product/product/transponders-regenerators/ (pp. 1-5).
Teleste Dah—Docsis Acces Hub—Satlan. (n.d.). Retrieved Jul. 21, 2020, from https://www.satlan.pl/en/products/data-transmission/docsis-2/teleste-dah-docsis-acces-hub/ (pp. 1-3).
Attenuation loss. Attenuation Loss—an overview | ScienceDirect Topics. (n.d.). Retrieved on Oct. 7, 2022 via Wayback Machine for Feb. 11, 2020, from http://www.sciencedirect.com/topics/computer-science/attenuation-loss (pp. 1-22).
Wikimedia Foundation. (Mar. 22, 2021). DOCSIS. Wikipedia. Retrieved Oct. 9, 2022 via Wayback Machine for Mar. 31, 2021 for https://en.wikipedia.org/wiki/DOCSIS (pp. 1-7).
Unpublished U.S. Appl. No. 17/695,780, Cook, Charles, "Transparent Clock Functionality in Regenerative Taps", filed Mar. 15, 2022 (pp. 1-92).
Anonymous, "IEEE Standard for a Precision Clock Synchronization Protocol for Networked Measurement and Control Systems", IEEE Instrumentation and Measurement Society, Nov. 7, 2019 (pp. 1-499).
Boundary Clocks 1588. NIST. (2010, Oct. 29). Retrieved Oct. 7, 2022, from https://www.nist.gov/el/intelligent-systems-division-73500/boundary-clocks-1588 (pp. 1-3).
Wikimedia Foundation. (Jan. 21, 2021). Precision time protocol. Wikipedia. Retrieved Oct. 7, 2022 via Wayback Machine for https://en.wikipedia.org/wiki/Precision_Time_Protocol (pp. 1-10).
QAM Modulator for the XC Platform, Retrieved Jul. 21, 2020 from https://www.appeartv.com/xc5000xc5100/qam-modulator (pp. 1-4).
Series G: Transmission Systems and Media, Digital Systems and Networks, International Telecommunication Union, Oct. 2020 (pp. 1-60).
Teleste Dah—DOCSIS Access Hub (n.d.). May 2015, Teleste Corporation (pp. 1-4).
Junos OS: Time Management Administration Guide, Juniper Networks, Sep. 23, 2021 (pp. 1-707).
Upstream Amplifiers, MaxLinear, Retrieved Jul. 29, 2020 from https://www.maxlinear.com/products/connected-home/cable-broadband (1 page).
Using Telephone and Cable Networks for Data Transmission, Retrieved Jul. 21, 2020 from http://novella.mhhe.com/sites/844815617x/student_view0/chapter9/index (1 page).
Generic Access Platform Modules Specification, Society of Cable Telecommunications Engineers (SCTE) Standards and Operational Practices, 2021, (pp. 1-61).
Generic Access Platform Enclosure Specification, Society of Cable Telecommunications Engineers (SCTE) Standards and Operational Practices, 2021. (pp. 1-69).

* cited by examiner

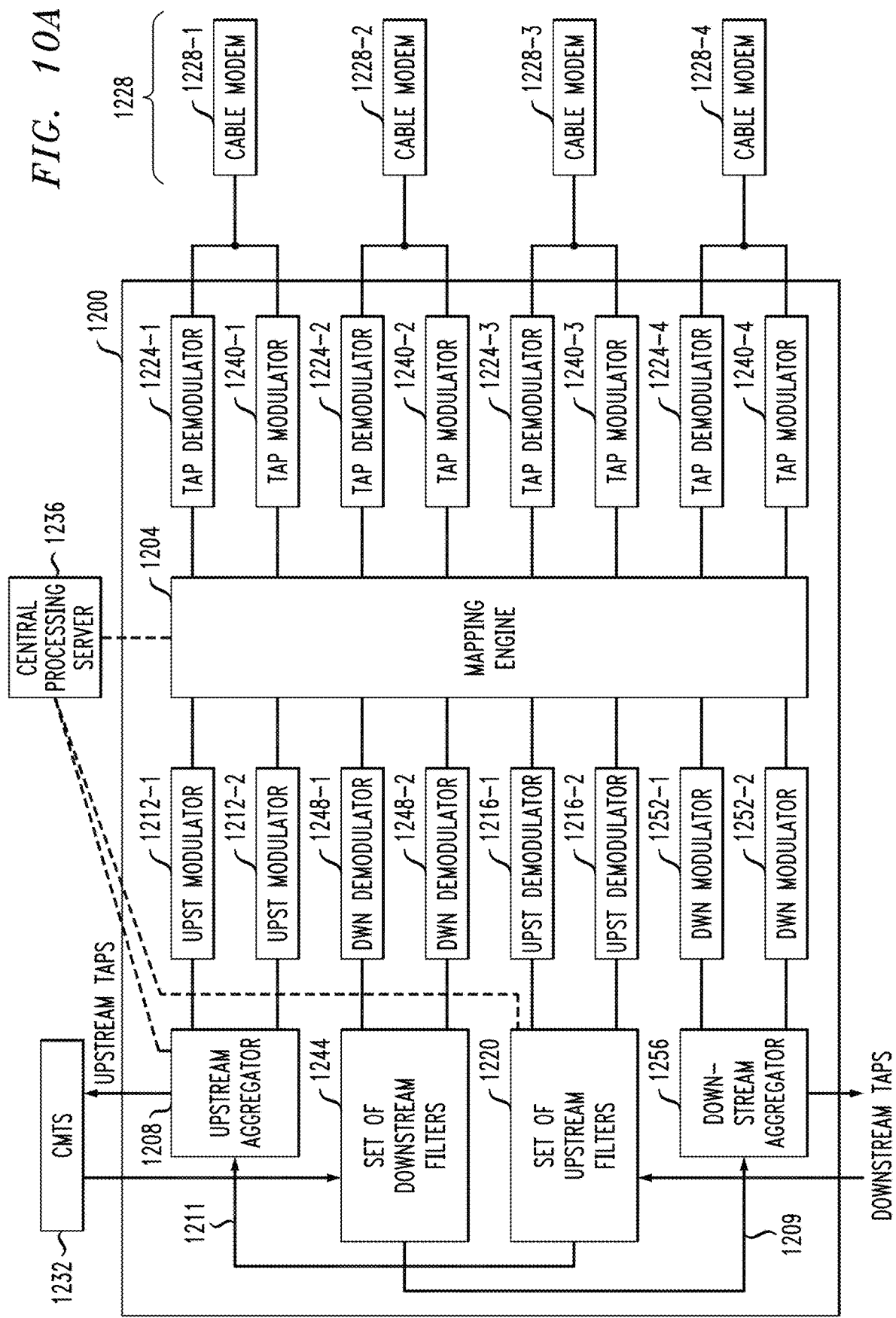

FIG. 13
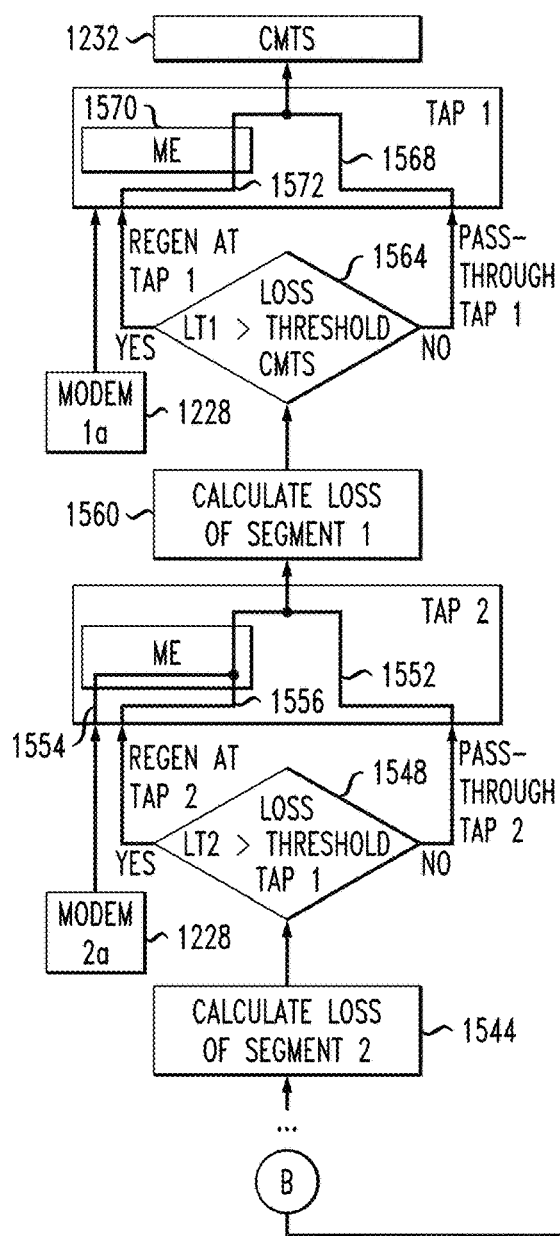
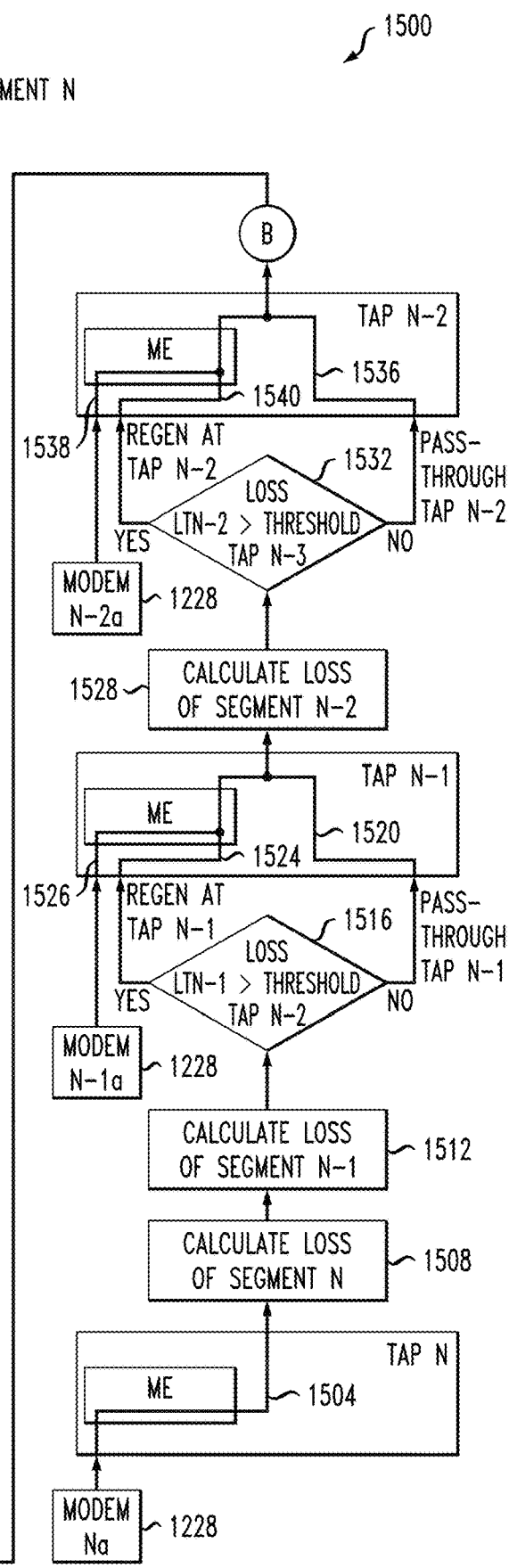

REGENERATIVE ACTIVE DISTRIBUTED NETWORKS

FIELD OF THE INVENTION

The present invention relates generally to the electrical, electronic and computer arts, and, more particularly, to broadband networks and/or video content networks, and the like.

BACKGROUND OF THE INVENTION

Data Over Cable Service Interface Specification (DOCSIS) is a shared medium broadband access technology that has served the cable industry for many years. The radio frequency (RF) characteristics of coax made it significantly more attractive than twisted-pair in terms of its ability to support video and broadband data. The main architecture limitation of DOCSIS is that it is a contention-based bus architecture whereas the twisted-pair architecture is a hub and spoke architecture. If the hybrid fiber-coaxial (HFC) network had been deployed using a hub and spoke architecture, many of the limitations that cable operators face today would be eliminated. Unfortunately, the physical size and cost of coax compared to twisted-pair made a hub and spoke topology for HFC networks economically impractical.

Fiber networks offer much more bandwidth than twisted pair and, in most cases, rather than deploying coax or twisted-pair, fiber is deployed when there is a new build. The cost to overlay existing networks with fiber, however, continues to be cost prohibitive when compared to discovering new ways to mine additional capacity out of existing HFC and twisted-pair deployments. Current DOCSIS implementations have, however, several issues that limit the capacity of the system.

SUMMARY OF THE INVENTION

Principles of the invention provide techniques for regenerative technology for networks. In one aspect, an exemplary method includes operations of grouping data channels, at baseband, of like data types into corresponding transmission groups; and modulating, by one or more upstream modulators, each transmission group at a frequency corresponding to a specific location in a spectral map.

In one aspect, a regeneration device comprises a mapping engine configured to rearrange a configuration of data on a plurality of data channels; a set of upstream filters, each upstream filter configured to pass one or more selected input radio frequency signals; a set of upstream demodulators, an input of each upstream demodulator configurable to be coupled to a selected one of the upstream filters and an output of each upstream demodulator coupled to the mapping engine; a set of upstream modulators, an input of each upstream modulator coupled to the mapping engine; an upstream aggregator comprising one or more inputs and configured to aggregate a plurality of upstream-bound radio frequency signals, each input configurable to be coupled to at least one selected upstream filter of the set of upstream filters and a selected upstream modulator; a set of tap demodulators, an output of each tap demodulator coupled to the mapping engine and configured to demodulate an inbound cable modem radio frequency signal from a corresponding inbound cable modem; and a set of tap modulators, an input of each tap modulator coupled to the mapping engine and configured to modulate an outbound cable modem radio frequency signal for a corresponding outbound cable modem.

In one aspect, a non-transitory computer readable medium comprises computer executable instructions which when executed by a computer cause the computer to perform the method of grouping data channels, at baseband, of like data types into corresponding transmission groups; and modulating, by one or more upstream modulators, each transmission group at a frequency corresponding to a specific location in a spectral map.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a regeneration device and central processing server) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. Some or all of the compute functions described herein can also be virtualized and located in the cloud.

Aspects of the present invention can provide substantial beneficial technical effects. For example, one or more embodiments of the invention achieve one or more of:
  regenerative technology for networks;
  enabling an independence of the spectrum plan (the assignment of spectrum to information) of a coaxial line emanating from a network node from the spectrum plan on the coaxial drop between a tap and a cable modem (CM) of the network;
  upgrade of the performance of an HFC network without having to replace all the CMs at the same time;
  re-modulation of data streams to different locations in the spectrum in order to improve the amount of data transported over the coax, improve the performance of the transmission (such as lower latency), and the like;
  enabling independence of the physical layer from the scheduler and control layer to achieve hardware simplification at the cable-modem termination system (CMTS) and adds the ability to locate the scheduler and control functions on commercial off-the-shelf (COTS) hardware, to the cloud, and the like;

enabling a graceful evolution from legacy amplifiers and taps to a hybrid system with both new regenerative taps (referred to as regeneration devices herein) and legacy amplifiers and taps;

a mapping engine for enabling the re-modulation of data streams to different locations in the spectrum;

a central processing server that assigns traffic destined to regenerative taps to particular sub-channels and configures filters to cause traffic destined to legacy taps to achieve low latency by bypassing the mapping engine;

the ability to configure a central processing server to avoid those parts of the spectrum in the DOCSIS system that are interfering with other systems, thereby enabling spectral compatibility;

enabling a robust system implementation through the use of redundant taps (active-standby redundancy);

reduced operating expenses as dispatches to repair taps can be deferred until multiple failures have occurred (thus reducing the number of service truck rolls);

the ability to remotely adjust the transmit level of a drop to a customer premises (and vice versa);

enabling a single type of tap to be used anywhere along the hard-line coax (thus eliminating the need for technicians to stock multiple value taps in their trucks, and eliminating installment errors where the wrong value tap may be installed); and enabling independence of the drop technology (from the coaxial line emanating from a network node) from the technology on the drop between a tap and a terminating device at the customer premises.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 10A is a block diagram of an example regeneration device, in accordance with an example embodiment;

FIG. 13 is a flowchart for an example method for determining whether data needs to be regenerated in the upstream direction, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
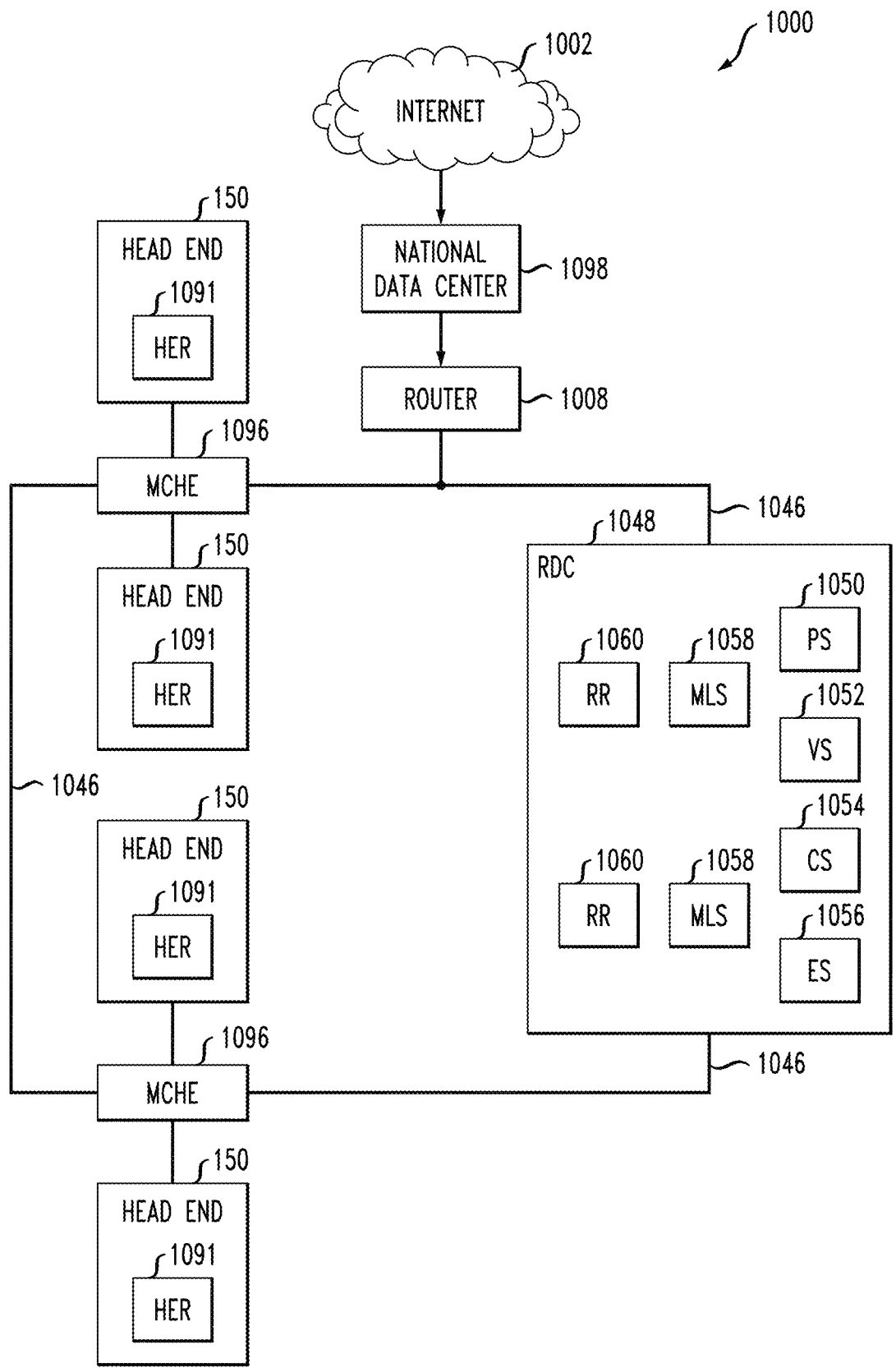
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
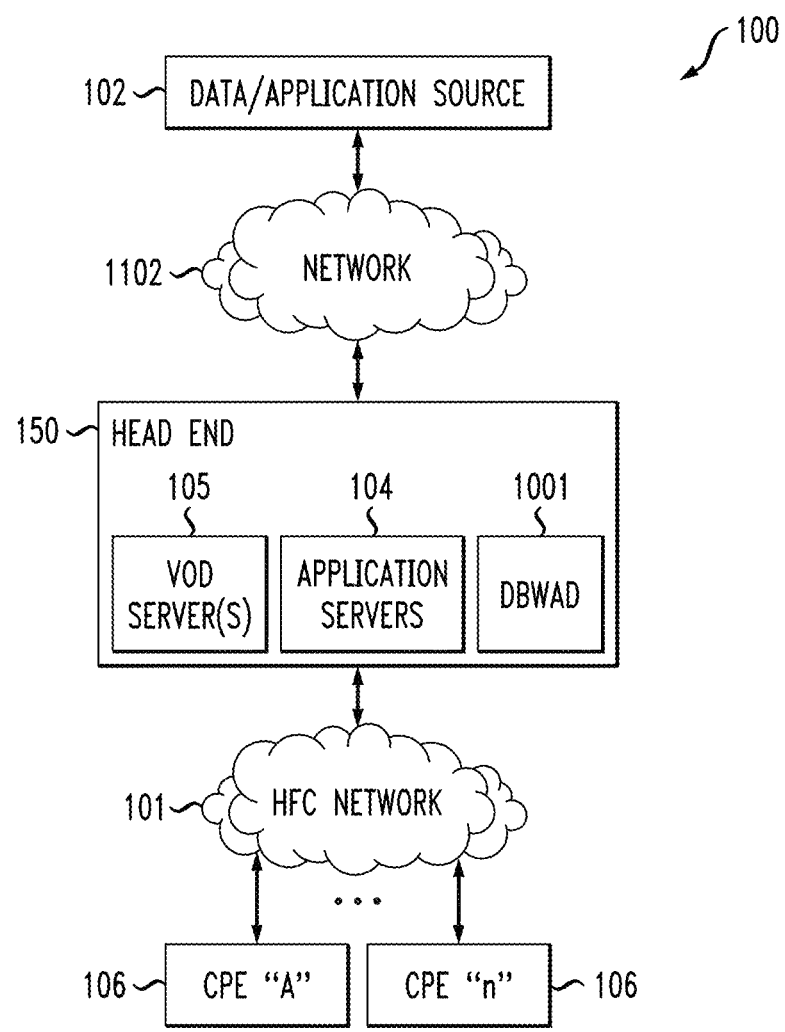
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
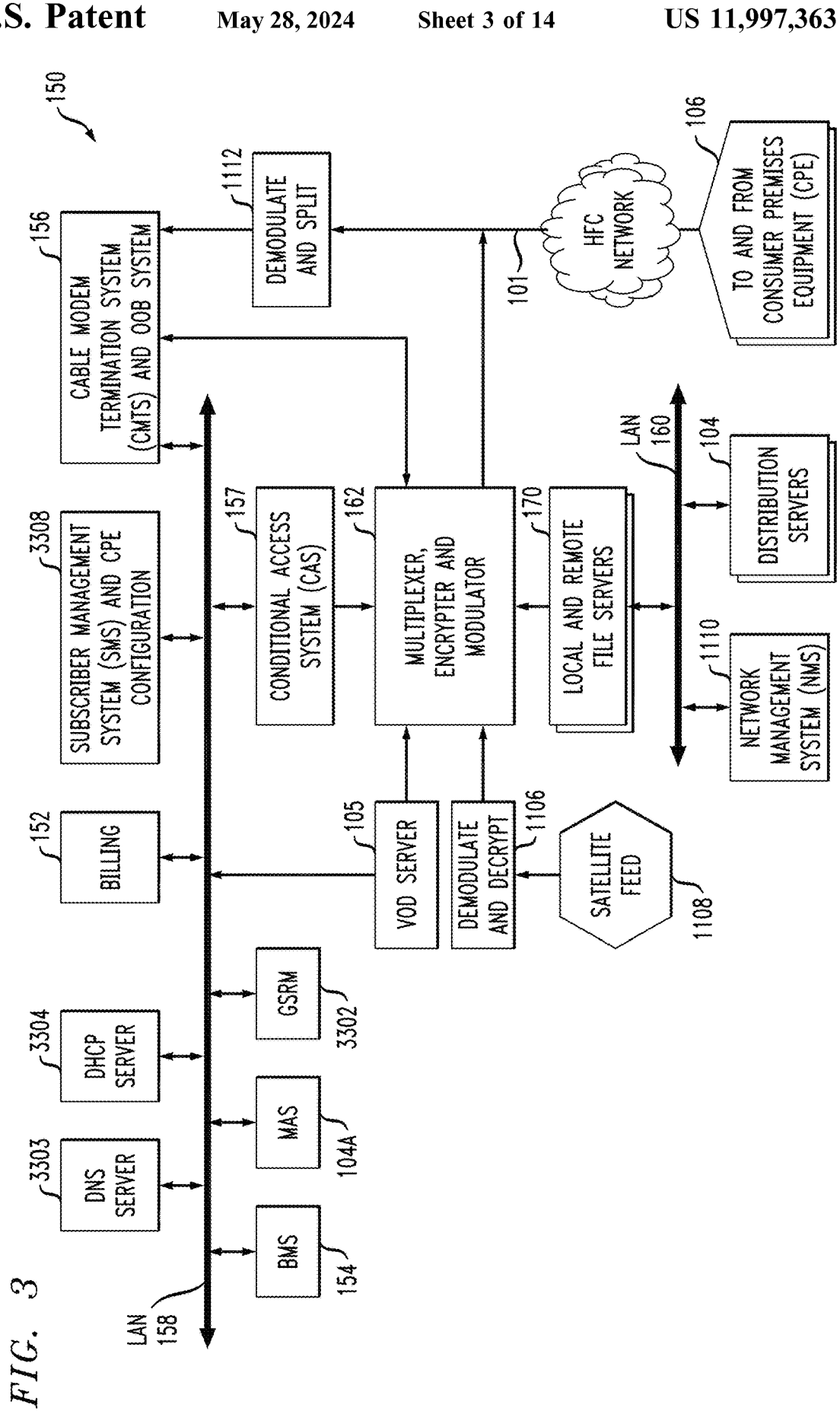
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOC SIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156. It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
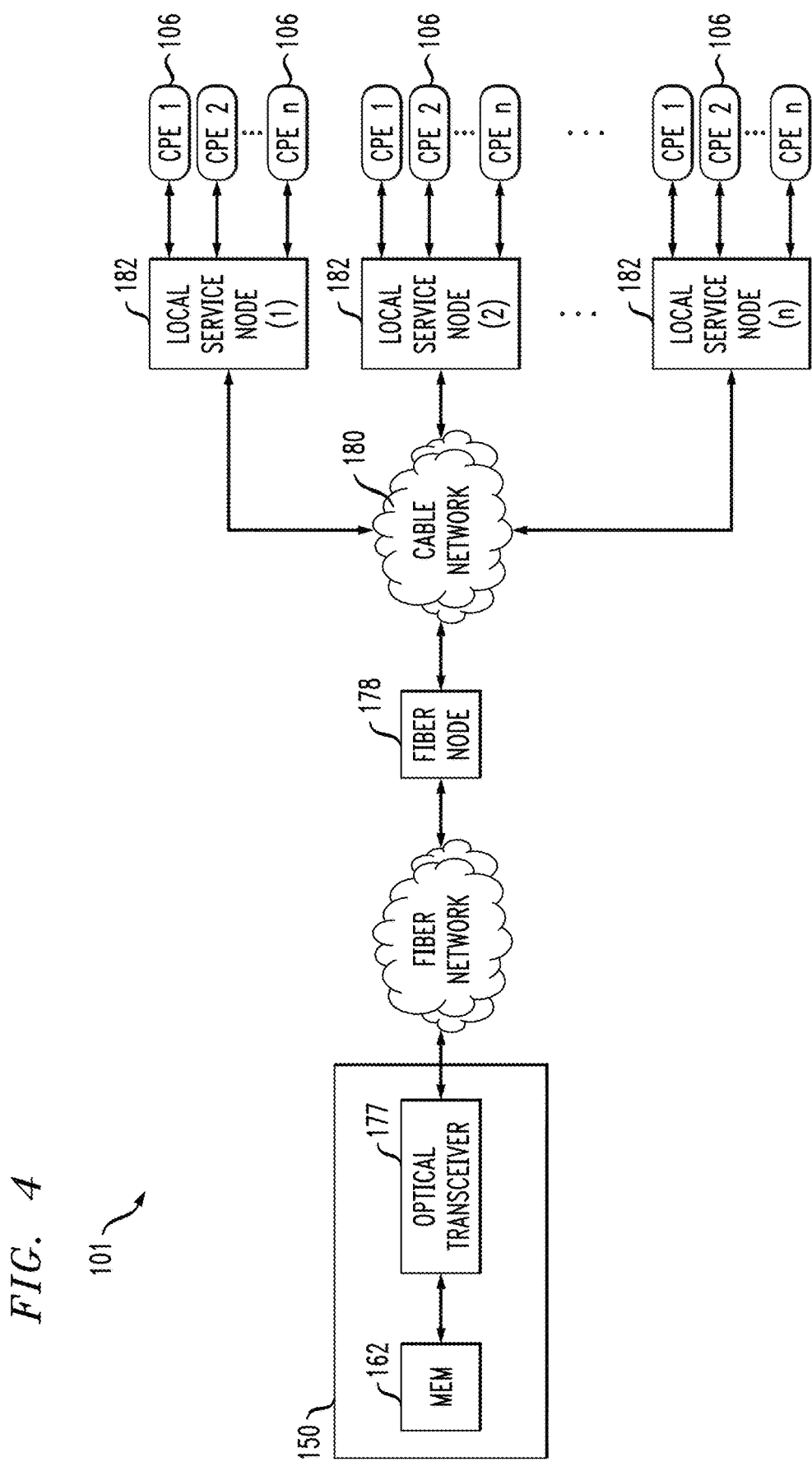
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
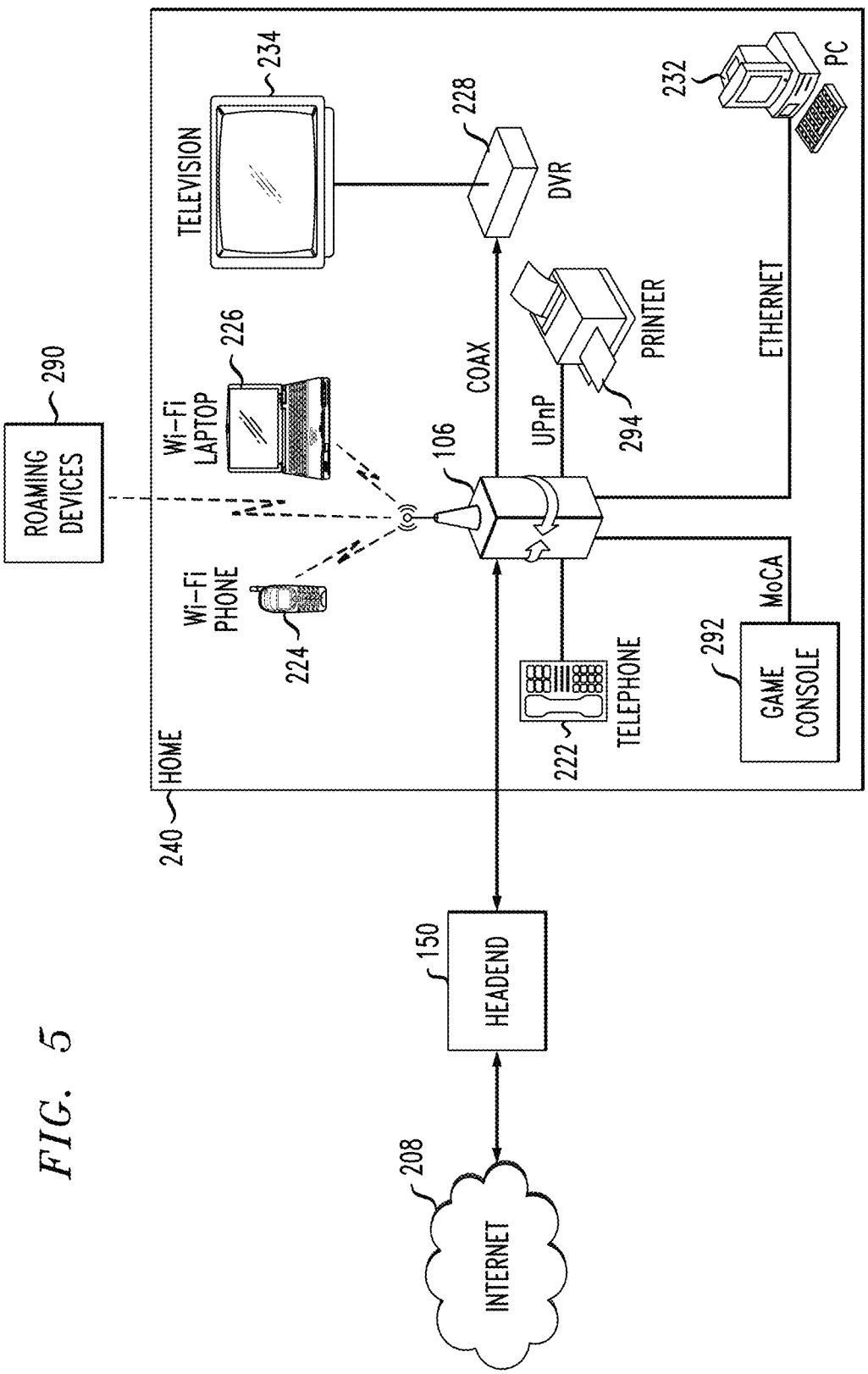
FIG. 5 is a functional block diagram of a premises network, including an exemplary centralized customer premises equipment (CPE) unit, interfacing with a head end such as that of FIG. 3.
Figure 6:
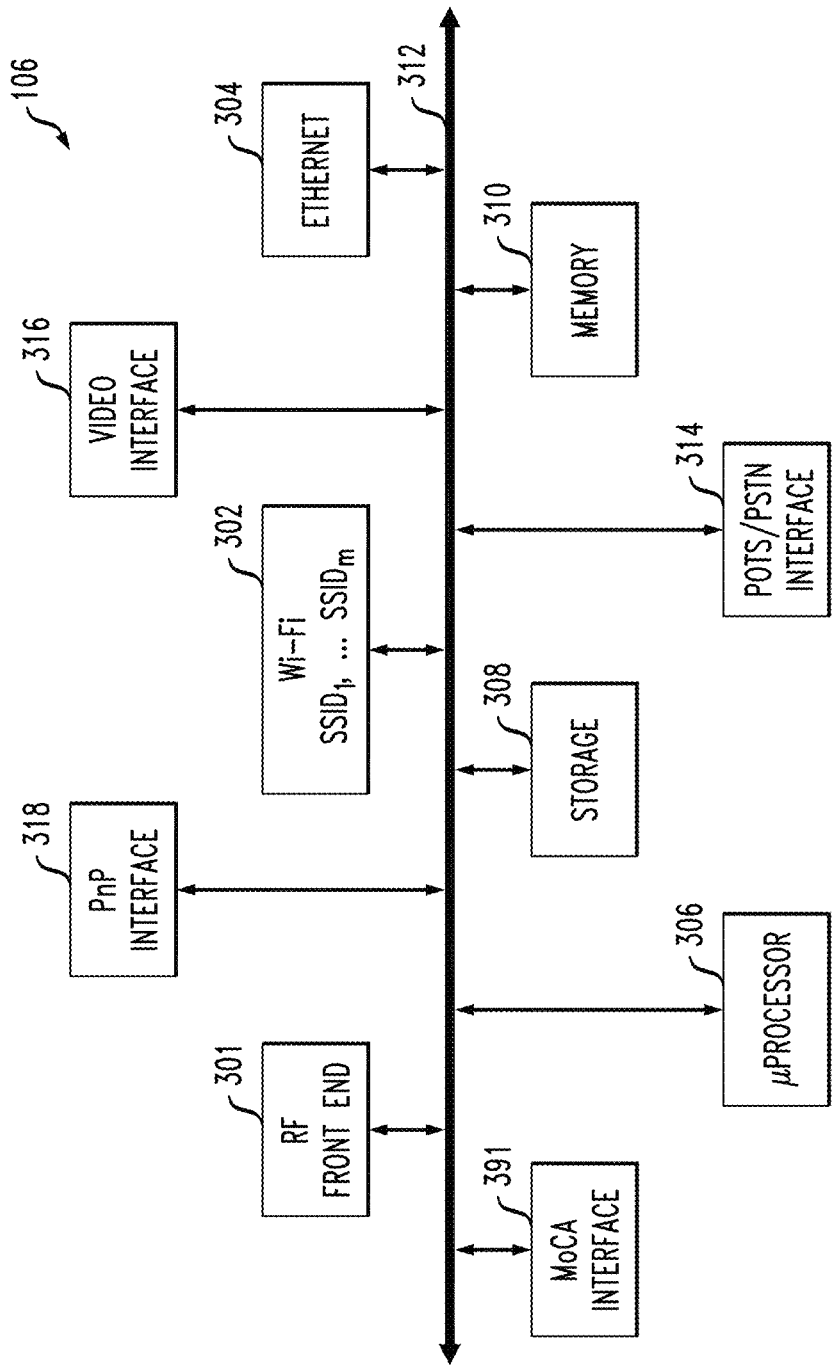
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
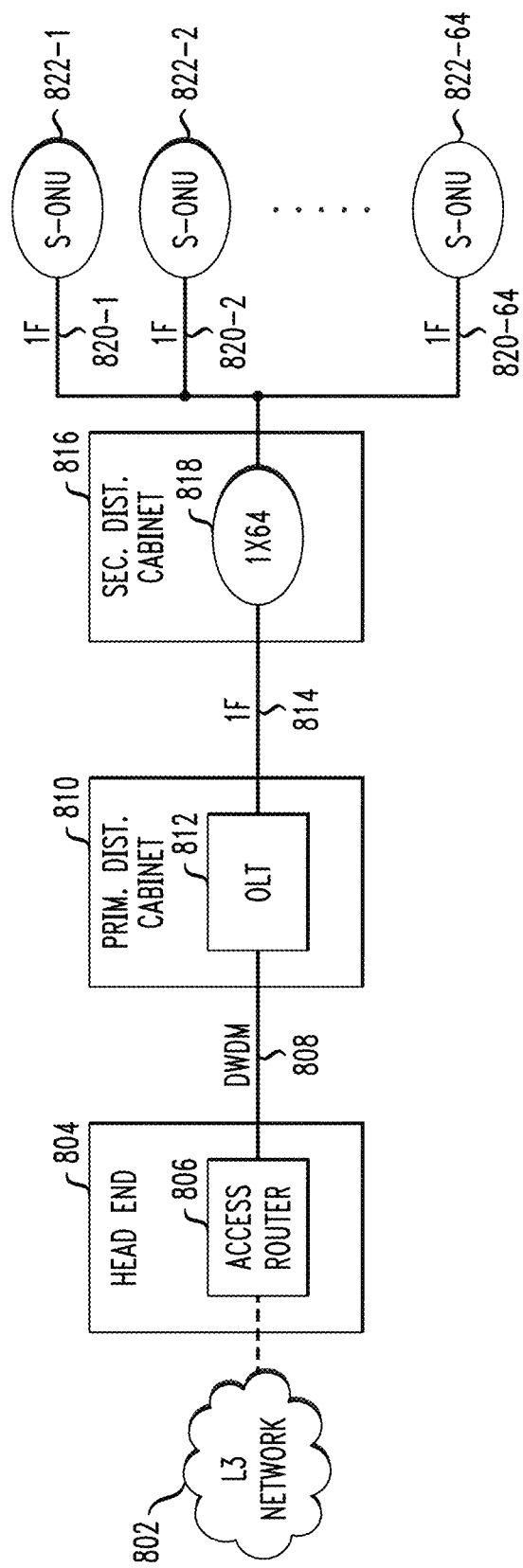
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
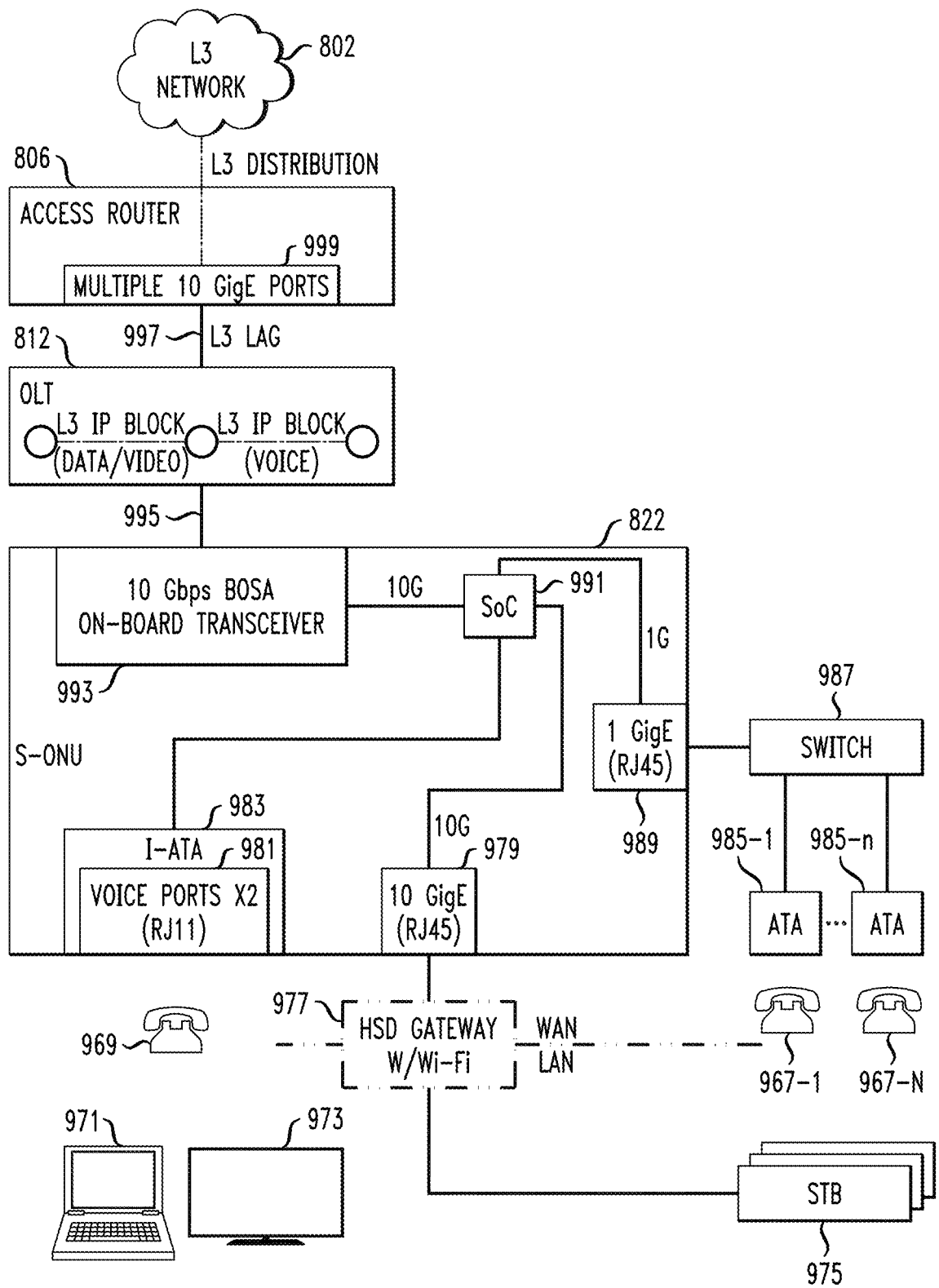
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-*n*, suitable for the needs of the business, via external analog telephone adapters (ATAs) 1985-1 through 1985-*n*. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein in the context of apparatus, systems, and methods for regenerative active distributed networks. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Generally, techniques for utilizing regenerators and active intelligence to improve network performance are disclosed. In one example embodiment, the techniques enable networks, such as cable networks, to make the spectrum plan (the assignment of spectrum to information) of a coaxial line emanating from a network node independent from the spectrum plan on the coaxial drop between a tap and a cable modem (CM) of the network. This enables, for example, the cable network operator (multi-services operator or MSO) to upgrade the performance of an HFC network without having to replace all the cable modems (CMs) at the same time. It also separates the physical layer from the scheduler and control layer to achieve hardware simplification at the cable modem termination system (CMTS), and adds the ability to locate the scheduler and control functions on commercial off-the-shelf (COTS) hardware, in the cloud, and the like. One or more embodiments advantageously extend the life of DOCSIS technology, including but not limited to DOCSIS 3.0, 3.1 and 4.0 (and subsequent versions). It is worth noting that in one or more embodiments, a port refers to the tap modulator and tap demodulator pair that connects a CM to the mapping engine, as will be apparent from further discussion herein.

The disclosed techniques enable the drop between the tap and the corresponding terminating equipment to be a variety of technologies. In one example embodiment, the coaxial drop can be replaced by various category (CAT) cablings and can use Ethernet (up to 100 m). The drop can also be replaced by a wireless link or a fiber link. (The terminating equipment terminates the signal from the network, and provides an interface to the customer's equipment, typically via Ethernet or Wi-Fi, but other technologies can also be utilized.) In one example embodiment, the system supports a 1 Gbps data connection to the tap and uses 1 Gbps (1000BASE-T) Ethernet from the tap to the cable modem to provide a 1 Gbps data connection between the tap and a 1000BASE-T Ethernet compatible device (e.g., a switch)

(located within 100 m of the tap). Furthermore in this regard, the distance that Standard 10BASE-T 1000BASE-T and 1000BASE-T Ethernet is designed to reach is about 100 m.

Limited Spectrum Availability

HFC plants have been designed based on the technology available at the time of deployment. Initially, plants were designed to operate over 300 MHz of spectrum; later systems used spectrum of 450 MHz, 600 MHz, 800 MHz, 1000 MHz, and 1200 MHz. Potentially, systems may extend the performance of coax to 1.8 GHz, 2.2 GHz, 3.0 GHz, and beyond. One main limitation to extending the spectral capacity is the frequency response of currently deployed amplifiers and taps. To upgrade the HFC plant to support more spectrum (which translates into more broadband capacity), all the amplifiers and taps on a given HFC node are conventionally replaced, if economically feasible. Cable operators, however, typically want to limit the number of times they have to upgrade the HFC plant. As spectrum increases, the distance that the DOCSIS signal can travel is typically reduced. This means that additional amplifiers are needed to maintain a sufficient signal-to-noise ratio (SNR) to support the higher-order modulations that are needed to be able to transmit more bits per Hertz. An issue with amplifiers is that, in addition to amplifying the DOCSIS signal, noise is also typically amplified. Consequently, there is a limit to the number of times that a signal can be amplified on a network path.

In one example embodiment, regenerators are used to augment and/or replace amplifiers. A regenerator receives a signal, demodulates the received signal to recover the original data stream, re-modulates the data stream, and transmits it. This process allows for some additional opportunities. For example, the data stream can be re-modulated to a different location in the spectrum in order to improve the amount of data transported over the coax, improve the performance of the transmission (such as at a lower latency), and the like. Additionally, when the signal is at baseband, the data stream can be merged with other data streams, separated out into multiple data streams, or otherwise manipulated based on, for example, the traffic type, the destination, latency requirements, jitter requirements, packet size, some other characteristic, or any combination thereof. At baseband, like data types can be grouped together and re-modulated together, and placed in a specific location in the available spectrum. For example, all voice data can be combined, all gaming data can be combined, and the like, and each data type can be relocated to the spectrum that is best for the corresponding traffic and/or the overall performance of the network. It is noted that a regenerator may be implemented with modulators and demodulators that are dedicated to interfacing with local cable modems or may exclude such modulators and demodulators with the regenerator being dedicated to regenerating signals between network nodes.

With regenerators in the line, potentially at each tap, the signal does not need to travel as far before it has an opportunity to be regenerated. Since the travel distance can be shortened, data streams can be re-modulated to higher points in the spectrum; instead of being limited to below 1.2 GHz or 1.8 GHz, data streams can be re-modulated to 3 GHz, 6 GHz, and beyond, up to the limitations of physics, resulting in much more capacity on the coax. Higher levels of modulation can also be supported (e.g., 2048-QAM, 4096-QAM, and the like).

Latency and Jitter

Different network-based services require different levels of performance. For example, browsing the Internet can tolerate high levels of latency and jitter and still provide a satisfactory user experience. Email can tolerate even more latency and jitter. Real-time applications, on the other hand, demand low latency and low jitter. Self-driving cars will require extremely low latency and jitter.

DOCSIS was not originally designed for low latency and jitter. It is a contention-based technology in conjunction with a scheduler, and handles best-effort services reasonably well. Efforts are currently underway to allocate a portion of the DOCSIS scheduler to be able to support limited amounts of low latency and jitter data, but the nature of contention-based schedulers limits what can be achieved. Consequently, gaming applications and the like can be negatively impacted, and backhaul services for mobile wireless applications may also be negatively impacted.

While regenerators have many benefits, one disadvantage is that conventional regenerators also add latency because it takes time to de-modulate, process, and re-modulate a data stream, typically requiring the design engineer to engage in a series of trade-offs. One approach to being able to manage latency and jitter is to manage the allocation of the spectrum (i.e., what data is placed in what part of the spectrum). Data streams that require low latency and jitter can be placed lower in the spectrum. The signal can travel farther before it needs to be regenerated or amplified because of its transmission lower in the spectrum. In one example embodiment, data requiring low latency and jitter is assigned to the lower portion of spectrum where signals successfully travel further. When the signal arrives at a device, the lower spectrum signals transporting the low latency, low jitter data may bypass regeneration, while the higher spectrum signals transporting the latency and jitter tolerant data may be regenerated via de-modulation, processing, and re-modulation. Stated in another way, when the signal arrives at the device, the device can be configured to either pass the signal along (bypassing the time-consuming de-modulation, processing, and re-modulation), or the device can capture the signal and re-generate it. FIG. 10A is a block diagram of an exemplary regeneration device 1200, in accordance with an example embodiment. The regeneration device 1200 comprises a mapping engine 1204, a set of filters 1220, a set of demodulators 1216-1, 1216-2, a set of modulators 1212-1, 1212-2, an aggregator 1208, a set of demodulators 1224-1, 1224-2, 1224-3, 1224-4, a set of filters 1244, a set of demodulators 1248-1, 1248-2, a set of modulators 1252-1, 1252-2, an aggregator 1256, and a set of modulators 1240-1, 1240-2, 1240-3, 1240-4. In one example embodiment, the regeneration device 1200 is used to implement a tap, as described herein. Signals from downstream network-based devices are received by the set of filters 1220. Each set of filters 1220, 1244 may include notch filters, low-pass filters, high-pass filters, bandpass filters and generally any type of filter instrumental in selecting individual sub-channels and/or groups of sub-channels. Signals that are bypassing regeneration are fed to the aggregator 1208 via bypass line 1211 while signals to be regenerated and/or remapped are demodulated by the set of demodulators 1216-1, 1216-2 and fed to the mapping engine 1204. Similarly, signals from upstream network-based devices, such as the CMTS 1232, are received by the set of filters 1244. Signals that are bypassing regeneration are fed to the aggregator 1256 via bypass line 1209 while signals to be regenerated and/or remapped are demodulated by the set of demodulators 1248-1, 1248-2 and fed to the mapping engine 1204.

The mapping engine 1204 maps signals received from the set of demodulators 1216-1, 1216-2 to the set of modulators 1212-1, 1212-2 and/or the set of modulators 1240-1, 1240-2, 1240-3, 1240-4, and maps signals received from the set of demodulators 1224-1, 1224-2, 1224-3, 1224-4 to the set of modulators 1212-1, 1212-2 and/or the set of modulators 1252-1, 1252-2. Similarly, the mapping engine 1204 maps signals received from the set of demodulators 1248-1, 1248-2 to the set of modulators 1252-1, 1252-2 and/or the set of modulators 1240-1, 1240-2, 1240-3, 1240-4, and maps signals received from the set of demodulators 1224-1, 1224-2, 1224-3, 1224-4 to the set of modulators 1212-1, 1212-2 and/or the set of modulators 1252-1, 1252-2.

Figure 10B:
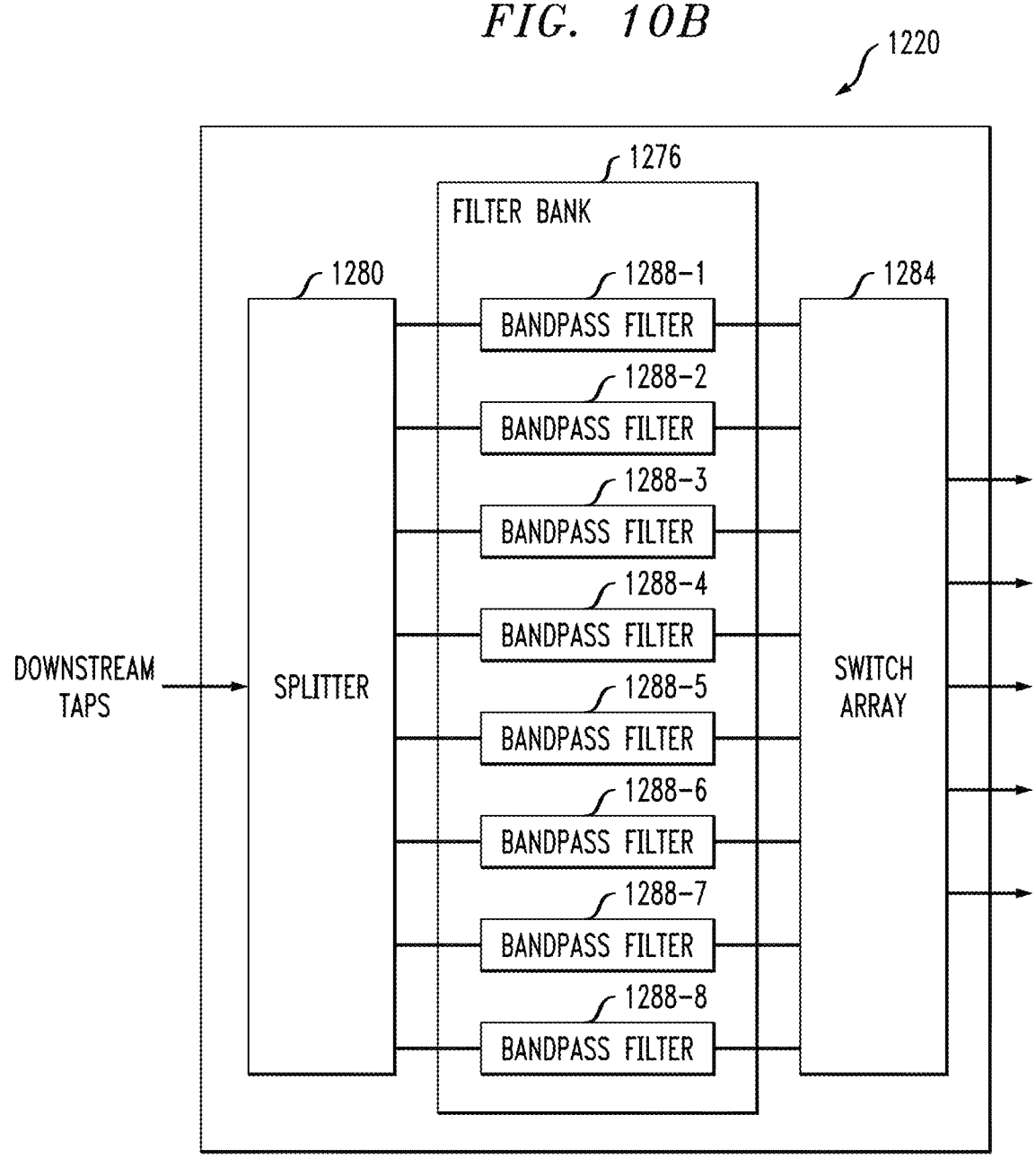
FIG. 10B is a block diagram of an example set of filters, in accordance with an example embodiment.

As noted above, each set of filters 1220, 1244 may include notch filters, low-pass filters, high-pass filters, bandpass filters and generally any type of filter instrumental in selecting individual sub-channels and/or groups of sub-channels. Each set of filters 1220, 1244 may be implemented in the digital domain or in the analog domain. FIG. 10B is a block diagram of an example set of filters 1220, in accordance with an example embodiment. The set of filters 1244 may also be implemented using the design of FIG. 10B. In the example embodiment of FIG. 10B, each set of filters 1220, 1244 utilizes a filter bank 1276, a splitter 1280, and an output switch array 1284. The filter bank 1276 is an array of bandpass filters 1288-1, 1288-2, 1288-3, 1288-4, 1288-5, 1288-6, 1288-7, 1288-8 that separates an input signal into component signals and sub-channels of different frequency ranges (a different number of filters could be used in other embodiments). For example, the first bandpass filter 1288-1 passes frequencies within a first frequency range, the second bandpass filter 1288-2 passes frequencies within a second frequency range, and so on. The splitter 1280 may be passive or active, and splits (passive splitter) or replicates (active splitter) the inbound signal from the coaxial cable to the regeneration device 1200 to generate an input signal for each bandpass filter 1288-1, 1288-2, 1288-3, 1288-4, 1288-5, 1288-6, 1288-7, 1288-8 of the filter bank 1276. By way of clarification, as will be appreciated from the preceding passage, it is worth noting that, in one or more embodiments, the signal is applied to all of the filters; no special processing is affirmatively required to split the signal (although in effect that is what happens; it is analogous to placing a lightbulb across a power source (e.g., battery), then placing a second one in parallel across the battery—now two bulbs light, but there was no special processing). Thus, the set of filters itself separates the received signal in to subsections. Once the received signal is separated, the central controller tells the switch whether the signal goes to the demodulators or the aggregator.

The switch array 1284 has an input for each bandpass filter 1288-1, 1288-2, 1288-3, 1288-4, 1288-5, 1288-6, 1288-7, 1288-8; each input of the switch array 1284 receives an output signal from a corresponding bandpass filter 1288-1, 1288-2, 1288-3, 1288-4, 1288-5, 1288-6, 1288-7, 1288-8 of the filter bank 1276. The switch array 1284 is capable of blocking an output signal from a corresponding bandpass filter 1288-1, 1288-2, 1288-3, 1288-4, 1288-5, 1288-6, 1288-7, 1288-8 or passing an output signal from a corresponding bandpass filter 1288-1, 1288-2, 1288-3, 1288-4, 1288-5, 1288-6, 1288-7, 1288-8 to an input of the corresponding aggregator 1208, 1256 or an input of the appropriate demodulator 1216-1, 1216-2, 1248-1, 1248-2. In one example embodiment, the switch array 1284 is controlled by a central processing server 1236, which, for example, instructs the switch array to either pass the filtered signal directly to the aggregator, or to the demodulators.

In one example embodiment, peer-to-peer communication between cable modems 1228-1, 1228-2, 1228-3, 1228-4 (collectively referred to as cable modems 1228 herein; see FIG. 10A) is supported by demodulating the signal via the corresponding demodulator 1224-1, 1224-2, 1224-3, 1224-4, mapping the data via the mapping engine 1204, and modulating the mapped data via the corresponding modulator 1240-1, 1240-2, 1240-3, 1240-4. In general, as used herein, peer-to-peer communication refers to transmission between cable modems 1228-1, 1228-2, 1228-3, 1228-4 corresponding to the same CMTS 1232. Thus, peer-to-peer communication includes communication between cable modems 1228-1, 1228-2, 1228-3, 1228-4 corresponding to different regeneration devices 1200.

In one example embodiment, the mapping engine 1204, the set of filters 1220, the aggregator 1208, the set of filters 1244, the mapping engine 1204, and the aggregator 1256 are controlled by the central processing server 1236, as described more fully below. The mapping engine 1204 is configured and controlled by the central processing server 1236. Although FIG. 10A only shows dotted lines from the central processing server 1236 to the set of filters 1220 and the aggregator 1208 for clarity, similar control channels exist between the central processing server 1236 and the other components under the control of the central processing server 1236.

The set of filters 1220 are coupled to the aggregator 1208, but whether any signals (RF channels) pass between the set of filters 1220 and the aggregator 1208 depends on the central processing server 1236. If the central processing server 1236 knows that a signal is sufficiently strong and that it does not need to be regenerated, based on provisioning information and calculations of signal attenuation (based on the length and type of transmission medium (coax in the case of a DOCSIS network) from the previous regeneration device 1200), the signal will be switched to be coupled from the set of filters 1220 to the aggregator 1208, thus by-passing the mapping engine 1204. A similar process is carried out for the set of filters 1244, the aggregator 1256, and the mapping engine 1204.

In another example embodiment, the signal strength at the input of the set of filters 1220, 1244 is measured and sent to the central processing server 1236. The central processing server 1236 uses this information to determine how to treat the signal. If a signal traveling in the upstream direction (towards the CMTS 1232) is sufficiently strong that it does not need to be regenerated (and remapping of the information carried by the signal is not necessary), the signal will be coupled from the set of filters 1220 to the aggregator 1208, thus by-passing the mapping engine 1204.

In an example embodiment, a configurable signal detection circuit is placed at the input of the set of filters 1220. The signal detection circuit monitors the signal strength of the signals. If the signal strength is greater than a predetermined threshold, the signal is determined to be sufficiently strong such that it does not need to be regenerated, and the signal is switched to be coupled from the set of filters 1220 to the aggregator 1208, thus by-passing the mapping engine 1204. The threshold value is provisioned by the central processing server 1236. This embodiment reduces the amount of communication between the set of filters 1220 and the central processing server 1236. In one example embodiment, the technique is also used in the other direction between the set of filters 1244 and aggregator 1256. This embodiment reduces the amount of communication between the set of filters 1244 and the aggregator 1256. In example embodiment, the threshold is provisioned by the service provider. Nominally, the threshold is dependent on the received SNR and whether it is sufficiently large to propagate to the next tap. The central processing server 1236 is aware of the distance to the next tap, and uses that information and characteristics of the coaxial cable to determine what the received SNR threshold needs to be. The target signal strength level of the signal sent to the cable modem 1228-1, 1228-2, 1228-3, 1228-4 is 0 dBmV. Typical satisfactory signals are in the range of −7 to +7 dBmV. (Some cable modems are designed to operate from −15 to +15 dBmV.) In general, central processing server 1236 can determine the threshold, or the threshold can be measured locally and acted upon, with an override capability in server 1236.

In a typical deployment, traffic traveling in the upstream direction will normally be addressed to the CMTS 1232. In this case, the mapping engine 1204 simply digitally regenerates the signal and passes it to the modulators 1212-1, 1212-2. If, however, there are two users where User B is southbound (downstream) of User A, and User B wants to send content to User A, rather than have the content travel all the way to the CMTS 1232 and upstream routers only to be routed back down to User A, a communications path can be established between User B and User A such that the content of User B is transmitted to the set of filters 1220, the central processing server 1236 causes the appropriate filter of the set of filters 1220 to switch the signal to the demodulators 1216-1, 1216-2 which are coupled to the mapping engine 1204. The central processing server 1236 instructs the mapping engine 1204 to switch the signal to modulators 1240-1, 1240-2, 1240-3, 1240-4 which are coupled to the corresponding cable modem 1228-1, 1228-2, 1228-3, 1228-4. Mapping engine 1204 may be split between an upstream mapping engine and a downstream mapping engine, if desired.

In one example embodiment, signals are grouped into orthogonal frequency-division multiplexing (OFDM) and orthogonal frequency-division multiplexing access (OFDMA) bands. (OFDMA is a time-shared and frequency-shared medium. In one example embodiment, OFDM is utilized in the downstream direction and OFDMA is utilized in the upstream direction since multiple cable modems 1228-1, 1228-2, 1228-3, 1228-4 are contending for access to bandwidth in the upstream direction. In the upstream direction, time and frequency slots are scheduled for use by the cable modems 1228-1, 1228-2, 1228-3, 1228-4 to enable the sharing of the same frequency and enable the transmission of data on OFDMA subcarriers in the upstream direction. OFDM and OFDMA are used interchangeably herein.) The OFDM bands that are lower in the spectrum can be passed through multiple devices, such as multiple regenerators 1200, without regeneration and hence lower latency and jitter. The OFDM bands that are higher in the spectrum can be populated with latency insensitive traffic and will be regenerated by the regeneration device 1200, when necessary. Control information is communicated between the regeneration device 1200 and a central processing server 1236 that is located, for example, in the service provider network, in the cloud, and the like. (As noted, some or all of the compute functions described herein can be virtualized and located in a cloud environment.) The central processor server 1236 configures each of the devices, including the regenerators 1200, along the signal path to ensure that traffic is placed in the right places in the spectrum to maximize the overall performance of the system. It is noted that jitter can be handled independently from latency. This can be accomplished by pre-allocating time and frequency assignments to keep the jitter constant.

In one example embodiment, if it is determined that DOCSIS is interfering with a wireless system as a result of unintended radiation from the coax, the central processing server 1236 can be configured to refrain from assigning that portion of the spectrum for use.

It is noted that the techniques disclosed herein may be applied to other communication technologies. For example, the mapping engine 1204 may group content arriving on different Single-Carrier Quadrature Amplitude Modulation (SC-QAM) channels and group them together with like services, or like performance, or according to needed propagation characteristics to optimize the system. In addition, the system has the ability to remotely adjust the transmit level of a drop to the customer premises (and vice versa) in the case where additional splitters have been installed at the customer premises, resulting in a stronger signal from the tap. The converse is also true—if splitters have been removed, the signal strength may need to be reduced accordingly. The system also enables a single type of tap to be used anywhere along the hard-line coax, thus eliminating the need for technicians to stock multiple value taps in their trucks, and eliminating installment errors where the wrong value tap may be installed.

Reliability

Typically, an HFC plant is deployed with one or more amplifiers and multiple taps extending out from a node. The amplifiers typically require power that is derived from the coax, but the taps are conventionally passive. In one example embodiment, the regeneration device 1200 replaces and/or augments both amplifiers and taps; it is an active device that requires power. The regeneration device 1200 can be configured with battery back-up or like to provide power in the event of a power failure, since, if the active device fails, all traffic intended for devices further along the line will be interrupted.

In one example embodiment, the regeneration device 1200 is implemented with at least 2× redundancy in either an active-active or active-standby configuration. In the case of 2× redundancy, the equivalent of two functional devices are utilized together and, in some instances, are packaged together. The dual units may be integrated together as a single physical unit incorporating two functional devices, or packaged as a unit with multiple device cards. In the latter case, when one card fails, only that card is replaced.

In one example embodiment, the regeneration device 1200 communicates its status to the central processing server 1236. The communication can include a heartbeat, an alarm, and the like. In the case of a heartbeat, when the central processing server 1236 fails to detect the heartbeat, it knows to begin diagnostics to determine the cause. If the cause is due to a failed device, a technician can be dispatched to replace the failed device. Replacement of the failed device can also be deferred until there are multiple failed devices; then only one dispatch is needed to replace the failed devices rather than utilizing a dispatch for each failed device. The redundant unit will continue to provide uninterrupted service during such a failure.

Legacy Taps

In a typical HFC network, rather than using devices at the customer premises that have a large dynamic range, the HFC plant is engineered to control the signal level between the mapping engine 1204 and each CM 1228-1, 1228-2, 1228-3, 1228-4 and to deliver approximately the same signal level to each customer premises location. The signal at the output of an amplifier is generally very strong. Consequently, the first legacy tap (a tap that does not utilize the regeneration device 1200) after the amplifier extracts a portion of the signal strength that is reduced by several decibels (dB) to deliver to the customer premises. The next legacy tap is farther away from the amplifier, so the signal level is lower. This legacy tap also extracts a portion of the signal strength that is also reduced by several dB, but not reduced by as many dB because the input signal was lower than it was at the first legacy tap. This process continues until the end of the line is reached, or the signal is too low to continue the process. The result is that a technician must have several different values of legacy taps available when deploying the service. This means that, conventionally, multiple stock-keeping units (SKUs) need to be inventoried and managed.

In one or more embodiments, the regeneration device 1200 is an active device that has the ability to adjust the output signal level to the customer premises location by increasing or decreasing the gain of the signal being delivered to the customer premises location via, for example, the set of modulators 1240-1, 1240-2, 1240-3, 1240-4. The gain can be automatically adjusted to maintain a relatively constant signal level. The gain can be adjusted through a feedback loop mechanism, or through the central processing server 1236 in communication with the mapping engine 1204.

Regeneration-Only Device

In one example embodiment, the amplification of the signals that are transmitted on the hardline coax between regeneration devices 1200 uses the same principle as above, but instead of the signals transmitted by the modulators 1240-1, 1240-2, 1240-3, 1240-4 being amplified, the signals transmitted on the hardline coax towards the upstream aggregator 1208 or the downstream aggregator 1256 are amplified. In one example embodiment, the modulators 1240-1, 1240-2, 1240-3, 1240-4 and the 1224-1, 1224-2, 1224-3, 1224-4 are not utilized when a drop to a customer premises is not needed at the corresponding tap. See, for example, co-assigned unpublished U.S. patent application Ser. No. 17/062,665 of first named inventor Charles Cook, entitled "Intelligent Tap with Dynamically Configurable Amplifier Gain," filed Oct. 5, 2020, the complete disclosure of which is expressly incorporated herein by reference herein in its entirety for all purposes.

The central processing server 1236 is provided with information on the physical makeup of the coaxial distribution plant (such as characteristics of the coax, length, and the like). Using this information, the central processing server 1236 calculates the loss of the signal to determine how much the signal at the tap needs to be amplified or attenuated. It then instructs the mapping engine 1204 to increase or decrease the signal in the digital domain such that, when it is modulated by modulator 1212-1, 1212-2, 1240-1, 1240-2, 1240-3, 1240-4, 1252-1, 1252-2, the resulting signal is at the appropriate level. Information about the gain is also communicated to the central processing server 1236, which also has the ability to configure the gain via the regeneration device 1200. Now, using one or more embodiments, a single SKU can replace the multiple SKUs previously required and overall inventory levels can be reduced.

Dedicated Bandwidth

As described above, the DOCSIS Network is a contention-based network. When bandwidth is requested, a grant request is sent from the CM 1228-1, 1228-2, 1228-3, 1228-4 to the CMTS. The scheduler in the CMTS then looks at available resources and provides a grant, if possible. If customer A is not using the network and customer B is, all grants can be given to customer B and vice versa. As the network becomes congested, sometimes a grant cannot be provided because resources are not available, or a grant is delayed until resources do become available. The result is that neither customer A nor customer B gets dedicated bandwidth.

Dedicated bandwidth can potentially be provided by permanently allocating grants for certain time slots, but if the client is not using it, the bandwidth is wasted. Regardless of potential waste, some clients desire to have dedicated bandwidth and are willing to tolerate the added cost.

In one example embodiment, an OFDM group or a sub-channel of an OFDM group can be permanently assigned to a customer. The OFDM group or sub-channel is, for example, permanently mapped to deliver user traffic to the CM 1228-1, 1228-2, 1228-3, 1228-4 associated with the customer. In other words, only traffic destined to this particular customer will be transported via the permanently mapped OFDM group or sub-channel. The size of the OFDM group or number of sub-channels assigned depends on the amount of dedicated bandwidth that the client has subscribed to. This channel goes all the way back to the network PHY device that receives and transmits all the channels at the physical layer. A PHY device is a device that operates at the Physical Layer (i.e., Layer 1 of the Open Systems Interconnection (OSI) model). It modulates baseband data to a carrier frequency that allows it to be transported across the medium (e.g., coax, twisted-pair, fiber, the air, and the like). There are PHY devices at both ends of the channel. For DOCSIS, it is, for example, the modulator/demodulator in the CMTS 1232, and the modulator/demodulator in the cable modem 1228.)

In the case where the OFDM group is permanently assigned, the channel that has been set up for the customer for dedicated bandwidth bypasses algorithms that manipulate OFDM group assignments and is aggregated into the network traffic. In one example embodiment, the scheduler is configured to always assign a particular customer's data to a specific OFDM group, and does not allow any other customer's data to be assigned to it unless the particular customer's queue is empty.

To add flexibility, the dedicated bandwidth can be divided into permanently dedicated bandwidth and non-permanently dedicated bandwidth. The permanently dedicated bandwidth is permanently assigned. The non-permanently dedicated bandwidth is bandwidth that is prioritized such that if the user does not consume the bandwidth, the unused bandwidth is made available to other users. This allows for unused bandwidth to be made available to best-effort subscribers. As the network becomes more dynamic and intelligent, permanently dedicated bandwidth can be reduced and more reliance placed on the non-permanently dedicated bandwidth.

In one example embodiment, since the scheduler knows whether or not there is any data in the queue destined to a particular customer, if the queue is empty, it can be temporarily assigned to a different customer at that instance in time. On the next cycle, the scheduler again checks to see if there is any data destined to this particular customer. If yes, data is delivered using that OFDM group or sub-group. If not, it is again temporarily assigned to a different customer. This technique may be used for implementing the "non-permanent dedicated bandwidth" described above.

Compatibility with Spectrum Plans

In a typical HFC plant, all of the CMs 1228-1, 1228-2, 1228-3, 1228-4 and amplifiers on the same line from a node should be compatible with the spectrum plan used. Because not all CMs 1228-1, 1228-2, 1228-3, 1228-4 and amplifiers are the same, the operator (e.g., MSO) should ensure that any changes to the spectrum plan are compatible with all the CMs 1228-1, 1228-2, 1228-3, 1228-4 on the coax line from the node. One reason to modify a spectrum plan is to increase system capacity by extending the upper end of the spectrum band. There may also be other reasons to modify a plan, such as to increase spectrum available for upstream traffic or reducing the spectrum allocated for QAM video channels, but before any changes can be made, it should be confirmed that the changes are compatible with the deployed CMs 1228-1, 1228-2, 1228-3, 1228-4 and amplifiers on the coax line from the network. The operator may have to swap out CMs 1228-1, 1228-2, 1228-3, 1228-4 and amplifiers at extra expense before compatibility can be achieved.

In one example embodiment, the regeneration device 1200 isolates the CM 1228-1, 1228-2, 1228-3, 1228-4 from the coax line coming from the network and is able to create a spectrum plan that is compatible with the existing CM 1228-1, 1228-2, 1228-3, 1228-4 at the customer premises location on a per customer premises location basis. The regeneration device 1200 then converts the traffic coming from the customer premises location to the spectrum plan on the coax line coming from the network which is likely to be much larger and more flexible. The regeneration device 1200 also communicates information about the spectrum plan for the link from the customer premises location to the regeneration device 1200 to the central processing server 1236. The central processing server 1236 also has the capability to configure the regeneration device 1200 to change the spectrum plan between the regeneration device 1200 and the customer premises location. This may be necessary if the customer connects a new CM 1228-1, 1228-2, 1228-3, 1228-4 with different capabilities to the drop coax line. The central processing server 1236 also has the capability to configure the regeneration device 1200 regarding how to map customer information onto the coax line coming from the network. This could include, for example, what OFDM group, or sub-channel or time slot, and the like, is to be utilized.

Upstream Bandwidth

In typical HFC deployments, there is a static split between spectrum allocated for downstream traffic and spectrum allocated for upstream traffic. Changing the location of the split requires that all CMs 1228-1, 1228-2, 1228-3, 1228-4 on the line are compatible with the new split. The split is typically not changed due to capital costs to do so. As demand for more and more upstream bandwidth grows, this may become a problem in conventional systems.

With the ability to isolate the spectrum plan between the customer premises location and the regeneration device 1200 from the spectrum plan on the coax line from the network, the operator is free to reconfigure the spectrum on the coax line from the network to any desired split between upstream and downstream channels. In one example embodiment, the moving of the split can be dynamic depending on the upstream and downstream bandwidth needs at any particular point in time. The change, and when to implement the change, are communicated from the central processing server 1236 to the regeneration devices 1200. In another example embodiment, the central processing server 1236 tracks the recent history of traffic and identifies patterns. For example, the traffic pattern of a weekday may differ significantly from the traffic pattern of a Saturday or Sunday. This identified traffic pattern can be used to dynamically shift the location of the upstream/downstream split to optimize the network based on what day it is. Other pattern variables include holidays, natural disasters, sporting events, elections, and the like. Then, at the scheduled time, the change is implemented.

Physical Layer and Control Layer Separation

Current implementations of HFC networks include a cable-modem termination system (CMTS) 1232. Currently, the CMTS 1232 combines the physical layer modulation/demodulation functions, the scheduling functions, and the CM management functions together. This requires that the CMTS 1232 be deployed at each hub, and then each hub supports multiple nodes. It has conventionally precluded the ability to move the scheduling and control functions to other locations in the network. The present techniques can be used with any architecture including the architecture of FIGS. 1-9, the Distributed Access Architecture (DAA), and the like. Furthermore, as noted elsewhere, the exemplary architecture in FIG. 3 shows a traditional location for the CMTS 156 in a head end, but, as will be appreciated by the skilled artisan, CMTS functionality (such as at 1232) can be moved down closer to the customers or up to a national or regional data center or can be dispersed into one or more locations.

By separating the physical layer modulation/demodulation functions from the scheduling functions and the CM management functions, an operator can take advantage of lower cost commodity hardware for the physical layer functions. At the same time, scheduling and CM management functions can be implemented in software. By implementing these functions in software, they can be deployed in commercial off-the-shelf (COTS) compute platforms and eliminate vendor lock-in. Additionally, these functions can be instantiated in the cloud for further virtualization (separating logical functions from the physical hardware; for example, the processing of the CMTS 1232 could be relocated to the cloud). As a result, the hardware can be vendor independent and upgraded independent of the scheduling and CM management functions.

Device Housings

Typically, each vendor of amplifiers and taps has its own form factor for the component's housing. The form factor includes connectors for the inputs and outputs of the amplifier and taps. When one of these devices fails or needs to be upgraded and/or needs to be replaced, the technician must unscrew the connectors, remove the old device, and insert the new device. If the form factors are different, this could be a difficult task and require additional time and expense. For example, there may be insufficient slack and flexibility in the cables to reattach the cabling.

By using a common form factor enclosure with slots to insert and remove cards/modules, cabling does not need to be disconnected and reconnected, making upgrades more efficient. All that is required of the technician is to open the enclosure, remove the old card, insert the new card, and close the enclosure. Using a common form factor also requires vendors to develop their cards to fit into the enclosure. If the operator needs to switch vendors, they can do so easily. This is analogous to the Generic Access Platform (GAP) project of the Society of Cable Telecommunications Engineers (SCTE) to design a similar enclosure for strand-mount devices.

Fiber Technology

Ultimately, the ever-increasing bandwidth needs of customers will exhaust the bandwidth capacities of an HFC network. Conventionally, nodes are split and a fiber is connected to the head of each node to provide a connection to the operator's network. To simplify and add flexibility to node splitting, the regeneration device 1200 can be implemented with an optical small form-factor pluggable (SFP.) The optical SFP allows for the regeneration device 1200 to become the head of a new node. The optical network could be either a direct Ethernet connection into the network or a passive optical network (PON) connection. Additionally, the regeneration device 1200 could switch directions so that, if it was in the middle of a line, the line is split into two and the regeneration device 1200 supports both halves. This would cut the number of times that node splits would be required. As the taps can be operated in both the forward and reverse direction, the number of points to establish as the head of the strand of taps can be reduced. For example, consider a plan to split a node into more than two nodes over time. If a node is split into three nodes, there will be a node (head) at the top of the first string of taps, a second node (head) at the bottom of the second string of taps, and a third node (head) collocated with the second node (head) at the top of the third string of taps. This reduces the number of geographic points where the head (beginning) of the node is created, and the number of locations where a power plant or other electronic device(s) associated with the beginning of a string of taps may need to be added is reduced. Since the regeneration device 1200 has the ability to turn any port (such as respective pairs of demodulators 1224-1, 1224-2, 1224-3, 1224-4 and modulators 1240-1, 1240-2, 1240-3, 1240-4) on or off, the original node can be remotely shorted and disconnected from the remainder of the line. Thus, in one example embodiment, the regeneration device 1200 is configured to individually enable and disable each data port of the regeneration device 1200 and thereby disconnect a remainder of a signal line of a network from another portion of the signal line of the network, wherein a portion of signal line connected to a disabled port exhibits its inherent characteristic impedance while coupled to the disabled port to, for example, reduce reflections (interference) and reduce power. The remainder of the line is fed in the middle and enables communication both before and after the center point in the remainder line. Alternatively, the new fiber can be connected at one end of the remainder line rather than in the middle of the remainder line. Operators may opt to do this depending on where it is easiest to get the fiber to the coax.

Noise

When coax is not terminated with its characteristic impedance, reflections can occur. These reflections result in noise that gets reflected back into the HFC network reducing the SNR, which reduces the degree of modulation that can be supported, which reduces the data bandwidth that can be supported. When service is disconnected, a technician conventionally terminates the coax with the characteristic impedance at the tap. By eliminating this step, operational costs can be reduced.

In one example embodiment, the regeneration device 1200 has the capability to turn off any port. This includes ports to the drop coax leading to the customer premises location, a port to the coax line from the network, or any other ports on the regeneration device 1200. Turning off a port at the regeneration device means making it appear as the characteristic impedance and not passing any traffic over it. Turning off ports when they are not in use reduces unnecessary noise entering into the system which means the system can modulate traffic to higher degrees of modulation. It also enables the regeneration device 1200 to remotely separate from the coax line that is continuing past it. This means that a node split can be more easily facilitated.

Latency

Generally, a regenerator adds more latency than passing the signal directly through. Often, the distance between taps is short enough that there is no reason to amplify or regenerate at the tap. Likewise, signals lower in the spectrum do not require regeneration or amplification as often as signals higher in the spectrum. By only regenerating when it is necessary, latency and power consumption can be reduced.

In one example embodiment, rather than regenerate or amplify at each tap, a controller and configurable filters are used to select which OFDMA group(s) or OFDMA sub-channel(s) bypass the mapping engine 1204, the sets of modulators 1212-1, 1212-2, 1252-1, 1252-2 and the sets of demodulators 1216-1, 1216-2, 1248-1, 1248-2. The central processing server 1236 maps the data into the appropriate location and sequences based on various parameters such as service type, latency, bandwidth, priority, and the like. Depending on the mapping, the data may be placed in any one of the OFDMA groups. For example, low-latency data may be placed in lower-spectrum OFDMA groups because it will not need to be amplified as often. Data destined to relatively close cable modems may be placed in higher-spectrum OFDMA groups so that lower-spectrum OFDMA groups can be reserved for cable modems located much farther away, OFDMA groups requiring low latency, and the like. Data associated with a particular service type could be grouped together to facilitate common treatment.

When data arrives at a configurable filter, such as a filter of the set of filters 1220, the central processing server 1236 knows which data to filter and pass through the mapping engine 1204, and which data to filter and bypass the mapping engine 1204. Data whose destination address is one of the cable modems 1228-1, 1228-2, 1228-3, 1228-4 subtended from the tap will be filtered to go to the mapping engine 1204 in order to be demodulated, routed to the correct port, re-modulated, and delivered to the destination address. Data that needs to be moved from one OFDMA group to another will be filtered to go to the mapping engine 1204 which will rearrange the data so that it will be regenerated and placed into the correct OFDMA group. Data whose SNR has deteriorated to the point that it needs to be re-generated will be filtered to the mapping engine 1204 so that it can be regenerated to the appropriate signal level and SNR. Data that is low latency with a sufficiently high SNR that re-generation is not necessary (that is, that the signal can be successfully demodulated at the next tap) will be filtered to bypass the mapping engine 1204. This process is applied in both the upstream and downstream directions. In the upstream direction, data comes into a filter of the set of filters 1220 and exits the aggregator 1208. In the downstream direction, data comes into a filter of the set of filters 1244 and exits the aggregator 1256.

The SNR value that is sufficiently high can be calculated using a number of techniques. In one example embodiment, a static method involves accessing a database that describes the design and deployment of the coaxial plant, including the characteristics of the coaxial cable and the distance between taps, calculating a theoretical loss, and calculating the resulting SNR. The calculations may be performed, for example, by the central processing server 1236.

Other Technologies

Note that the described embodiments can be applied, for example, to any DOCSIS CATV network, including a DOCSIS 3.1, DOCSIS 4.0, or later CATV network using OFDMA, as well as any system that modulates information and places it into channels divided by frequency, including other metallic physical systems, fiber physical systems, wireless physical systems, and the like. The mechanism of assigning/dedicating channels can be done on any communications network, including DOCSIS, PON, twisted-pair, wireless, and the like.

The disclosed techniques can also be applied to other architectures by using modulators and demodulators specific to that technology. For example, the modulators 1240-1, 1240-2, 1240-3, 1240-4 and demodulators 1224-1, 1224-2,

1224-3, 1224-4 that exist between the mapping engine 1204 and cable modems 1228-1, 1228-2, 1228-3, 1228-4 can be replaced with Ethernet PHY modulators and demodulators if the cable modem 1228-1, 1228-2, 1228-3, 1228-4 is replaced with an Ethernet device. Likewise, these same modulators 1240-1, 1240-2, 1240-3, 1240-4 and demodulators 1224-1, 1224-2, 1224-3, 1224-4 could be replaced with optical modulators and demodulators if the cable modem 1228-1, 1228-2, 1228-3, 1228-4 is replaced with an optical device. In fact, these same modulators 1240-1, 1240-2, 1240-3, 1240-4 and demodulators 1224-1, 1224-2, 1224-3, 1224-4 could be replaced with RF modulators and demodulators if the cable modem 1228-1, 1228-2, 1228-3, 1228-4 is replaced by an RF device. Likewise, the modulators 1212-1, 1212-2, 1252-1, 1252-2 and demodulators 1216-1, 1216-2, 1248-1, 1248-2 that are used to connect to the aggregators 1208, 1256 and sets of filters 1220, 1244 for data communications over coax can be replaced with modulators and demodulators to connect to the aggregators 1208, 1256 and sets of filters 1220, 1244 for data communications over fiber or RF.

Mapping Algorithm

The central processing server 1236 configures the taps by sending various messages uniquely addressed to each tap. Example messages include, but are not limited to:

By-Pass DS[RF0(Y/N), RF1(Y/N); RF2(Y/N), . . . RFn (Y/N)]—This message instructs the set of filters 1244 in the downstream direction whether to switch the RF channel to the demodulators 1248 and to the mapping engine 1204.

By-Pass US[RF0(Y/N), RF1(Y/N); RF2(Y/N), . . . RFn (Y/N)]—This message instructs the set of filters 1220 in the upstream direction whether to switch the RF channel to the demodulators 1216 and to the mapping engine 1204.

Port Amplification[USPort1(#)]—This message instructs the mapping engine 1204 what to digitally add to the demodulated sample to amplify it for transmission in the upstream direction on the hard-line coax. For example, if the analog voltage of the signal sampled on the hard-line coax is 1 volt (V), the corresponding analog-to-digital converter (ADC) outputs the value of 1. If the sampled analog signal is 2 V, the ADC responds outputs the value of 2. In the opposing direction, if a value of 1 is input into the corresponding digital-to-analog converter (DAC), the DAC generates a 1 V analog signal. If a value of 2 is input into the DAC, the DAC generates a 2 V analog signal. While in the digital domain, if the value of 3 is added to the original values of 1 and 2 at the input of the DAC, the output generated by the DAC is 4 V and 5 V, respectively.

Port Amplification[DSPort1(#), DSPort2(#), . . . DSPortn (#)]—This message instructs the mapping engine 1204 what to digitally add to the demodulated sample to amplify it for transmission in the downstream direction on the hard-line coax. Note that there may be more than one downstream hard-line branch.

Port Amplification[CMPort(#), CMPort2(#), . . . , CMPortn(#)]—This message instructs the mapping engine 1204 what to digitally add to the demodulated sample to amplify it for transmission to the corresponding cable modem 1228-1, 1228-2, 1228-3, 1228-4. Note that there may be multiple ports with a drop coax to the cable modem 1228-1, 1228-2, 1228-3, 1228-4.

Start Time[CMD(date,time)]—This message informs when the Command (e.g., By-Pass DS, By-Pass US, Port Amplification, etc.) is enabled.

End Time[CMD(date,time)]—This message informs when the Command (e.g., By-Pass DS, By-Pass US, Port Amplification, etc.) is disabled.

In one example embodiment, with time-based commands, several commands can be stored at the tap to invoke changes based on time of day, date, month, a special event, and the like. In one example embodiment where data may be switched from one RF channel to another RF channel by the mapping engine 1204, the following commands are used:

RF Map DS[DA(RF1), DA2(RF2, . . . DAn(RFn)]—This message instructs the mapping engine 1204 to map data with a particular destination address to a particular RF channel in the downstream direction.

RF Map US[OA(RF1), OA2(RF2, . . . OAn(RFn)]—This message instructs the mapping engine 1204 to map data with a particular origination address (from the CM 1228-1, 1228-2, 1228-3, 1228-4) to a particular RF channel in the upstream direction.

Ultimately, as processing capabilities of network equipment and computing systems continue to increase in the future, these commands can be sent continuously to each of the taps for a constantly evolving configuration to dynamically adapt on a packet-by-packet basis.

Establishing Objectives

The treatment of data can be based on a number of different objectives. Examples of some types of objectives are enumerated below. These objectives can be implemented individually or in combinations resulting in more complex sorting and mapping algorithms. The disclosed techniques allow for more flexibility in treating data packets because, in addition to treating data in the time domain, data packets are also treated in the frequency domain. Specifically, the use of mapping to frequency bands adds power and latency attributes to the treatment of data packets that were not previously available.

Power Savings

A service provider may want to minimize the amount of power required to transfer data packets. In one example embodiment, this is accomplished by managing the OFDM frequency groups and subchannels such that, as data packets are delivered to regenerators at the beginning of a distribution system, the number of OFDM groups and subchannels are reduced. Specifically, there is no need to power a regeneration device 1200 farther down the distribution plant if the data packets have already been delivered. Amplifiers are conventionally used to amplify across the entire system spectrum. In one example embodiment, there is an amplifier for each OFDM group (or portion of the frequency spectrum). At the first tap, it is possible that all the amplifiers are needed to transmit across the complete range of spectrum used. As traffic is dropped off, it is no longer necessary to regenerate that data further down the hard-line coax. For example, if traffic is evenly distributed along the hard-line coax and the taps connected to it, then at the half-way point, half the traffic will have been delivered. If the remaining traffic is grouped together into the minimum number of OFDM groups or sub-channels, only half need to be amplified to continue to propagate down the hard-line coax. Hence, half of the amplifiers can be turned off.

Upstream/Downstream Splits

As traffic patterns evolve, the ratio of upstream versus downstream traffic may change, and the service provider may want to change the allocation of resources available to each direction of traffic flow. In one example embodiment, this is accomplished by changing which OFDM frequency groups and subchannels are used in each direction of traffic flow. Depending on the sharpness of filters and attributes of the service, any set of frequencies can be used in one direction, and the remaining frequencies can be used in the other direction. This mapping can be changed as needed.

Historically, all downstream traffic has been grouped together, and all upstream traffic has been grouped together so that there is only one split between upstream and downstream traffic and filters do not have to be particularly sharp. In one example embodiment, multiple splits are configured. For example, an MSO may want to have an up/down split for low latency traffic and another up/down split for latency insensitive traffic.

In one example embodiment, since the taps can be operated in both the forward and reverse direction, the number of points to establish as the head of the strand of taps can be reduced. This is evident with a plan to split a node into more than two nodes over time. For example, if a node is split into three nodes, a node (head) will exist at the top of the first string of taps, a second node (head) will exist at the bottom of the second string of taps, and a third node (head) will exist collocated with the second node (head) at the top of the third string of taps. This reduces the number of geographic points where the head (beginning) of the node is created, and reduces the number of locations where a power plant or other electronics associated with the beginning of a string of taps may be added.

Low Latency

A service provider may want to offer a low-latency service. In one example embodiment, this is accomplished by identifying the low latency data packets and placing them in the lowest OFDM groups and subchannels because lower-frequencies propagate farther, meaning that fewer regenerators are needed. Each regenerator will contribute additional delay. Latency can be reduced by minimizing the number of regenerators and/or by bypassing regenerators when the lower frequency signals have sufficient SNR to not require regeneration.

Prioritization

Priorities can be assigned based on the assignment of sub-channels. High priority can be mapped to fill the lowest sub-channel first, then the next sub-channel, and so on, and the lowest priority placed in the highest sub-channel. In this way, the lowest priority traffic will end up being regenerated the most because of the shorter propagation for the higher sub-channels.

Priorities can also be assigned within OFDM groupings. For example, there may be an OFDM grouping for low latency, another OFDM grouping for video streaming, and the like. With these groupings, a customer that has subscribed to a higher priority service will be serviced first within that service grouping.

Real-Time

Real-time data transmission can be addressed by permanently assigning a specific sub-channel(s) to the user and only permit the user to populate those sub-channel(s). By doing so, the allocated bandwidth will always be available. Hence, real-time traffic can be supported. As previously stated, to increase system capacity, if the queue for a particular sub-channel is empty, it can be temporarily used to transmit another user's data.

Guaranteed

Guaranteed traffic is implemented similar to Real-time traffic (in that sub-channels can be permanently assigned). Additionally (but not as solidly guaranteed), a higher priority can be assigned to ensure traffic of a customer with guaranteed service will be serviced first.

Assign Attributes

Each sub-channel can be assigned to carry traffic with like attributes. For example, the lowest sub-channels can be assigned to low latency data such that all low latency traffic will be mapped to those sub-channels. In general, a location attribute can be assigned. For example, the closest CMs 1228-1, 1228-2, 1228-3, 1228-4 can be assigned to the highest sub-channels, and the distant CMs 1228-1, 1228-2, 1228-3, 1228-4 can be assigned to lower sub-channels. Other sub-channels may be assigned for guaranteed traffic, to be treated as an aggregated group for higher bandwidth, and the like. There may be other attributes identified and assigned to sub-channels with the objective to optimally sort and deliver traffic based on an optimization of the network and customer needs. Attributes are prioritized and organized either individually or collectively depending on the needs of the service provider and the customer.

Establish Relationships

Relationships may be established, such as grouping users of the same throughput service together, grouping all gamers together, and the like, and over-subscription levels can be managed by allocating x number of customers to a group of sub-channels designed to deliver a certain throughput with a certain over-subscription level based on historical use patterns. A budget service may be offered to a highly over-subscribed group of sub-channels. Customers that utilize primarily one type of application (such as email, web browsing, and the like) may be grouped together for common treatment.

Controller Algorithm—Downstream Direction

Figure 11:
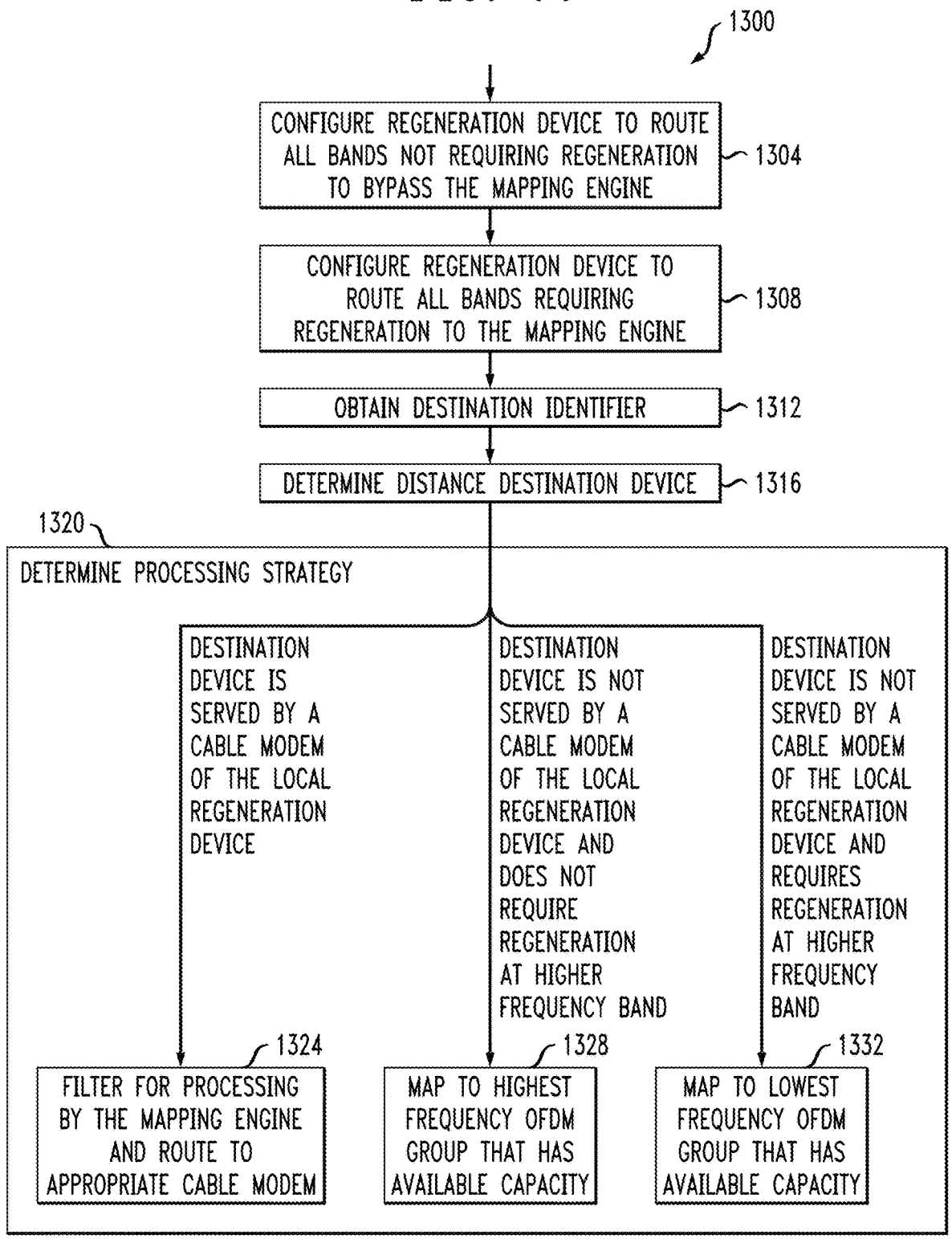
FIG. 11 is a flowchart of an example method for mapping incoming traffic in a regeneration device, in accordance with an example embodiment.

FIG. 11 is a flowchart of an example method 1300 for mapping incoming traffic in a regeneration device 1200, in accordance with an example embodiment. In one example embodiment, the regeneration device 1200 is configured to route all bands not requiring regeneration to bypass the mapping engine 1204 and travel directly to the appropriate aggregator 1208, 1256 (based on the direction of travel), as instructed by the central processing server 1236 (operation 1304). The regeneration device 1200 is configured to route all bands requiring regeneration to the mapping engine 1204 and on to the appropriate aggregator 1208, 1256 (based on the direction of travel), as instructed by the central processing server 1236 (operation 1308). The destination identifier for an incoming packet is obtained (operation 1312). A distance to the device identified by the packet identifier in the packet header is determined (operation 1316). A processing strategy for the packet is determined (operation 1320). If the destination device is served by a CM 1228-1, 1228-2, 1228-3, 1228-4 of the local regeneration device 1200, the packet is filtered for processing by the mapping engine 1204 and routed to the appropriate CM 1228-1, 1228-2, 1228-3, 1228-4 (operation 1324). If the destination is not served by a CM 1228-1, 1228-2, 1228-3, 1228-4 of the local regeneration device 1200 and is at a distance that does not require regeneration at a higher frequency band, the packet is mapped to the highest frequency OFDM group that has available capacity (operation 1328). If the destination is not served by a CM 1228-1, 1228-2, 1228-3, 1228-4 of the local regeneration device 1200 and is at a distance that requires regeneration, the packet is mapped to the lowest frequency OFDM group that has available capacity (operation 1332).

Figure 12:
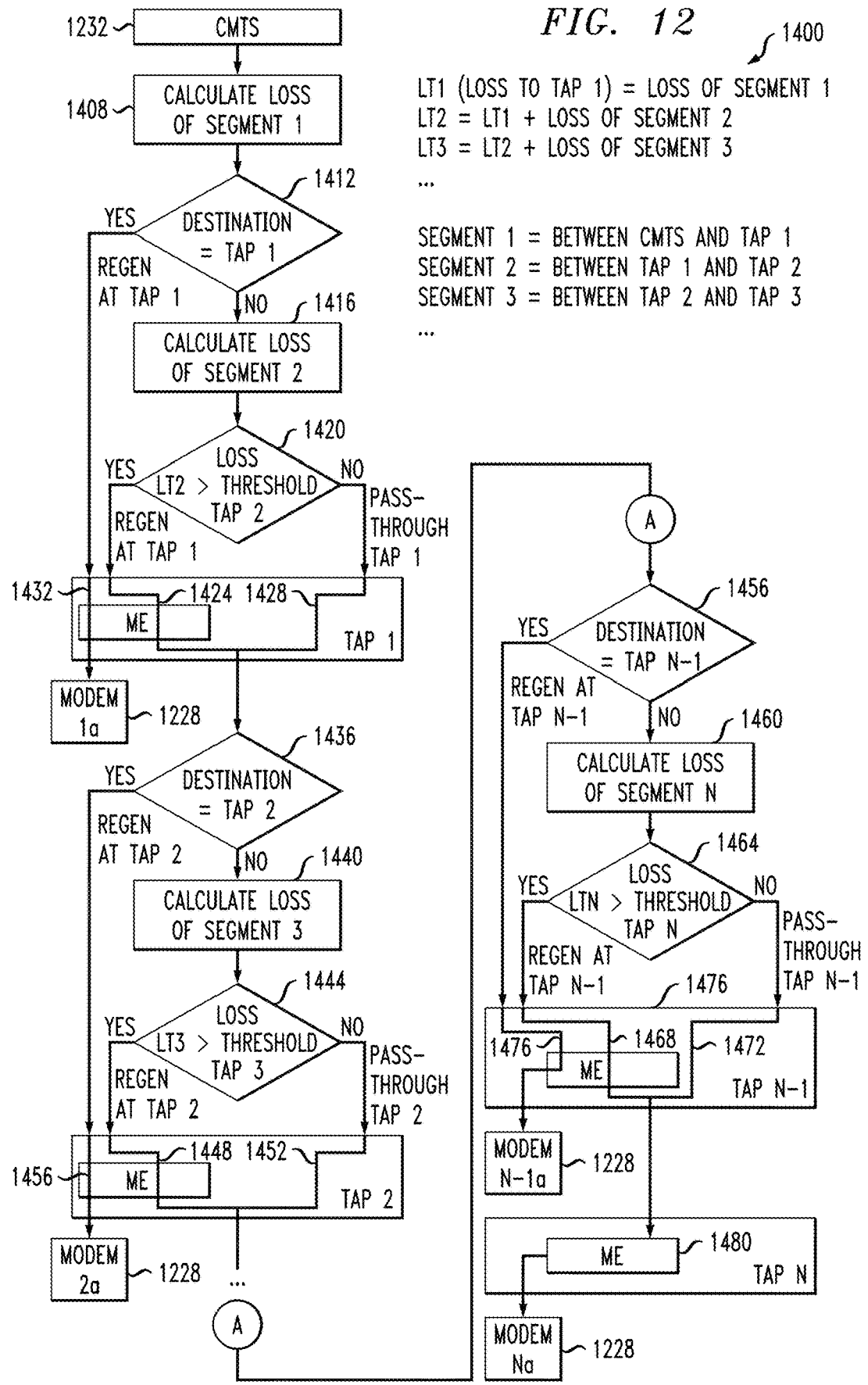
FIG. 12 is a flowchart for an example method for determining whether data needs to be regenerated in the downstream direction, in accordance with an example embodiment.

FIG. 12 is a flowchart for an example method 1400 for determining whether data needs to be regenerated in the downstream direction, in accordance with an example embodiment. In one example embodiment, the signal loss of a first segment (Segment 1) is calculated (operation 1408). A check is performed to determine if the destination is the first tap (Tap 1) (operation 1412). If Tap 1 is the destination, the signal is mapped to the appropriate cable modem 1228-1, 1228-2, 1228-3, 1228-4 (operation 1432). If Tap 1 is not the destination, the loss of a second segment (Segment 2) is calculated (operation 1416). A check is performed to determine if the loss at Tap 2 is greater than the threshold at Tap 2 (operation 1420). If the loss at Tap 2 is greater than the threshold at Tap 2, the signal is regenerated at Tap 1 (operation 1424). If the loss at Tap 2 is not greater than the threshold at Tap 2, the signal is passed-through to Tap 2 (operation 1428). It is noted that the ellipses in FIGS. 12 and 13 represent that the operations similarly repeat for all taps between Tap 2 and Tap N.

A check is performed to determine if the destination is the second tap (Tap 2) (operation 1436). If Tap 2 is the destination, the signal is mapped to the appropriate cable modem 1228-1, 1228-2, 1228-3, 1228-4 for regeneration (operation 1456). If Tap 2 is not the destination, the loss of a third segment (Segment 3) is calculated (operation 1440). A check is performed to determine if the loss at Tap 3 is greater than the threshold at Tap 3 (operation 1444). If the loss at Tap 3 is greater than the threshold at Tap 3, the signal is regenerated at Tap 2 (operation 1448). If the loss at Tap 3 is not greater than the threshold at Tap 3, the signal is passed-through to Tap 3 (operation 1452).

A check is performed to determine if the destination is Tap N−1 (operation 1456). If Tap N−1 is the destination, the signal is mapped to the appropriate cable modem 1228-1, 1228-2, 1228-3, 1228-4 (operation 1476). If Tap N−1 is not the destination, the loss of an $N^{th}$ segment (Segment N) is calculated (operation 1460). A check is performed to determine if the loss at Tap N is greater than the threshold at Tap N (operation 1464). If the loss at Tap N is greater than the threshold at Tap N, the signal is regenerated at Tap N−1 (operation 1468). If the loss at Tap N is not greater than the threshold at Tap N, the signal is passed-through to Tap N (operation 1472) and passed-through to the appropriate cable modem 1228-1, 1228-2, 1228-3, 1228-4 (operation 1480).

Controller Algorithm—Upstream Direction

In one example embodiment, the upstream path is the inverse of the downstream path except that the frequencies are different. The central processing server 1236 has knowledge of the allocations and calculates both the downstream and upstream maps and distributes the maps to, for example, the regeneration devices 1200. In one example embodiment, the calculation and distribution of both the downstream and upstream maps are performed at the same time. This minimizes processing in the mapping engine 1204.

FIG. 13 is a flowchart for an example method 1500 for determining whether data needs to be regenerated in the upstream direction, in accordance with an example embodiment. In general, if the loss threshold for a signal is not crossed, the signal bypasses the mapping engine 1204; if the loss threshold is crossed, the signal is routed to the mapping engine 1204 to be regenerated. In one example embodiment, a signal may be passed through from a cable modem 1228-1, 1228-2, 1228-3, 1228-4 located at Tap N towards a Tap N−1 (operation 1504). The loss of Segment N is calculated (operation 1508) and a loss of Segment N−1 is calculated (operation 1512).

A check is performed to determine if the loss at Tap N−1 is greater than the threshold at Tap N−2 (operation 1516). If the loss at Tap N−1 is greater than the threshold at Tap N−2, the signal is regenerated at Tap N−1 (operation 1524). If the loss at Tap N−1 is not greater than the threshold at Tap N−2, the signal is passed-through Tap N−1 (operation 1520). It is noted that a signal from a cable modem 1228-1, 1228-2, 1228-3, 1228-4 located at Tap N−1 may be passed to the mapping engine 1204 (operation 1526).

The loss of Segment N−2 is calculated (operation 1528) and a check is performed to determine if the loss at Tap N−2 is greater than the threshold at Tap N−3 (operation 1532). If the loss at Tap N−2 is greater than the threshold at Tap N−3, the signal is regenerated at Tap N−2 (operation 1540). If the loss at Tap N−2 is not greater than the threshold at Tap N−3, the signal is passed-through Tap N−2 (operation 1536).

The loss of Segment 2 is calculated (operation 1544) and a check is performed to determine if the loss at Tap 2 is greater than the threshold at Tap 1 (operation 1548). If the loss at Tap 2 is greater than the threshold at Tap 1, the signal is regenerated at Tap 2 (operation 1556). If the loss at Tap 2 is not greater than the threshold at Tap 1, the signal is passed-through Tap 2 (operation 1552). In one example embodiment, a signal may be passed through from a cable modem 1228-1, 1228-2, 1228-3, 1228-4 located at Tap 2 towards a Tap 1 (operation 1554).

The loss of Segment 1 is calculated (operation 1560) and a check is performed to determine if the loss at Tap 1 is greater than the threshold at the CMTS 1232 (operation 1564). If the loss at Tap 1 is greater than the threshold at the CMTS 1232, the signal is regenerated at Tap 1 (operation 1572). If the loss at Tap 1 is not greater than the threshold at the CMTS 1232, the signal is passed-through Tap 1 (operation 1568). In one example embodiment, a signal may be passed through from a cable modem 1228-1, 1228-2, 1228-3, 1228-4 located at Tap 1 towards the CMTS 1232 (operation 1570). It is noted that the ellipses in FIG. 12 represent that the operations similarly repeat for all taps between Tap 2 and Tap N.

Recapitulation

Given the discussion thus far, it will be appreciated that, in general terms, an exemplary method, according to an aspect of the invention, includes the operations of grouping data channels, at baseband, of like data types into corresponding transmission groups; and modulating, by one or more upstream modulators 1212-1, 1212-2, each transmission group at a frequency corresponding to a specific location in a spectral map. In one example embodiment, the transmission groups are modulated at frequencies that avoid interference with wireless communication spectrum.

In one example embodiment, one or more data streams that require one or more of low latency and low jitter are mapped to lower frequency spectrum of the spectral map than a frequency spectrum of the spectral map used for latency-tolerant and jitter-tolerant data channels. In one example embodiment, one filter of a set of downstream filters 1244 and a set of upstream filters 1220 are configured to bypass regeneration for lower spectrum signals transporting low latency, low jitter data; and one filter of the set of downstream filters 1244 and the set of upstream filters 1220 are configured to route higher spectrum signals transporting latency-tolerant and jitter-tolerant data channels for regeneration via a mapping engine 1204. In one example embodiment, a mapping engine 1204 is configured to pre-allocate time and frequency assignments to reduce signal jitter. In one example embodiment, at least one tap modulator 1240-1, 1240-2, 1240-3, 1240-4 is configured to adjust a gain of an output signal in one or more of a digital domain and an analog domain.

In one example embodiment, at least one tap modulator 1240-1, 1240-2, 1240-3, 1240-4 is configured to receive an instruction to adjust a gain of an output signal level. In one example embodiment, a tap modulator 1240-1, 1240-2, 1240-3, 1240-4 and a tap demodulator 1224-1, 1224-2, 1224-3, 1224-4 are configured to individually enable or disable a data port. In one example embodiment, data designated in a header to be routed to a cable modem 1228-1, 1228-2, 1228-3, 1228-4 residing closer to a regeneration device 1200 is mapped to a higher frequency signal than data designated in the header to be routed to a cable modem 1228-1, 1228-2, 1228-3, 1228-4 that is farther away from the regeneration device 1200. In one example embodiment, one filter of a set of downstream filters 1244 and a set of upstream filters 1220 is configured to filter data designated in a header to be moved from one transmission group to another transmission group and configuring a mapping engine 1204 to remap the data designated in the header to be moved from one transmission group to another transmission group. In one example embodiment, one filter of a set of downstream filters 1244 and a set of upstream filters 1220 is configured to filter data having a signal-to-noise ratio (SNR) that is insufficient to successfully transfer data and configuring a mapping engine 1204 to map the data having the signal-to-noise ratio (SNR) that is insufficient to successfully transfer data for regeneration to an appropriate signal level and SNR that is sufficient to transfer the data.

In one example embodiment, one filter of a set of downstream filters 1244 and a set of upstream filters 1220 is configured to filter data having a signal-to-noise ratio (SNR) that is sufficient to successfully transfer data and to route data having a signal-to-noise ratio (SNR) that is sufficient to successfully transfer data to bypass the mapping engine 1204. In one example embodiment, one tap demodulator 1224-1, 1224-2, 1224-3, 1224-4 of a set of tap demodulators 1224-1, 1224-2, 1224-3, 1224-4, one tap modulator 1240-1, 1240-2, 1240-3, 1240-4 of a set of tap modulators 1240-1, 1240-2, 1240-3, 1240-4, and a mapping engine 1204 are configured to deliver peer-to-peer network traffic. In one example embodiment, a mapping engine 1204 is configured to dynamically shift a location of an upstream/downstream spectrum split based on an identified traffic pattern. In one example embodiment, a regeneration device 1200 is configured to divide dedicated bandwidth of the spectral map into permanently dedicated bandwidth and non-permanently dedicated bandwidth, wherein the non-permanently dedicated bandwidth dynamically shrinks and expands based on a data load assigned to the permanently dedicated bandwidth.

In one aspect, a regeneration device 1200 comprises a mapping engine 1204 configured to rearrange a configuration of data on a plurality of data channels; a set of upstream filters 1220, each upstream filter 1220 configured to pass one or more selected input radio frequency signals; a set of upstream demodulators 1216-1, 1216-2, an input of each upstream demodulator 1216-1, 1216-2 configurable to be coupled to a selected one of the upstream filters 1220 and an output of each upstream demodulator 1216-1, 1216-2 coupled to the mapping engine 1204; a set of upstream modulators 1212-1, 1212-2, an input of each upstream modulator 1212-1, 1212-2 coupled to the mapping engine 1204; an upstream aggregator 1208 comprising one or more inputs and configured to aggregate a plurality of upstream-bound radio frequency signals, each input configurable to be coupled to at least one selected upstream filter 1220 of the set of upstream filters 1220 and a selected upstream modulator 1212-1, 1212-2; a set of tap demodulators 1224-1, 1224-2, 1224-3, 1224-4, an output of each tap demodulator 1224-1, 1224-2, 1224-3, 1224-4 coupled to the mapping engine 1204 and configured to demodulate an inbound cable modem radio frequency signal from a corresponding inbound cable modem 1228-1, 1228-2, 1228-3, 1228-4; and a set of tap modulators 1240-1, 1240-2, 1240-3, 1240-4, an input of each tap modulator 1240-1, 1240-2, 1240-3, 1240-4 coupled to the mapping engine 1204 and configured to modulate an outbound cable modem radio frequency signal for a corresponding outbound cable modem 1228-1, 1228-2, 12248-3, 1228-4.

In one example embodiment, the regeneration device 1200 further comprises a set of downstream filters 1244, each downstream filter 1244 configured to pass one or more selected downstream input radio frequency signals; a set of downstream demodulators 1248-1, 1248-2, an input of each downstream demodulator 1248-1, 1248-2 configurable to be coupled to a selected one of the downstream filters 1244 and an output of each downstream demodulator 1248-1, 1248-2 coupled to the mapping engine 1204; a set of downstream modulators 1252-1, 1252-2, an input of each downstream modulator 1252-1, 1252-2 coupled to the mapping engine 1204; and a downstream aggregator 1256 comprising one or more inputs and configured to aggregate a plurality of downstream-bound radio frequency signals, each input configurable to be coupled to at least one selected downstream filter 1244 of the set of downstream filters 1244 and a selected downstream modulator 1252-1, 1252-2.

In one example embodiment, the mapping engine 1204 is further configured to group the data channels, at baseband, of like data types into corresponding transmission groups; and modulate, by one or more of the upstream modulators 1212-1, 1212-2, each transmission group at a frequency corresponding to a specific location in a spectral map. In one example embodiment, one or more data streams that require one or more of low latency and low jitter are mapped, by the mapping engine 1204, to lower frequency spectrum of the spectral map than a frequency spectrum of the spectral map used for latency-tolerant and jitter-tolerant data channels. In one example embodiment, one filter of the set of downstream filters 1244 and the set of upstream filters 1220 is configurable to bypass regeneration for lower spectrum signals transporting low latency, low jitter data; and one filter of the set of downstream filters 1244 and the set of upstream filters 1220 is configurable to route higher spectrum signals transporting latency-tolerant and jitter-tolerant data channels for regeneration via the mapping engine 1204. In one example embodiment, the mapping engine 1204 is further configured to pre-allocate time and frequency assignments to reduce signal jitter.

In one example embodiment, at least one of the tap modulators 1240-1, 1240-2, 1240-3, 1240-4 is configurable to adjust a gain of an output signal in one or more of in a digital domain and in an analog domain. In one example embodiment, at least one of the tap modulators 1240-1, 1240-2, 1240-3, 1240-4 is configurable to receive an instruction to adjust a gain of an output signal level of a selected tap modulator 1240-1, 1240-2, 1240-3, 1240-4. In one example embodiment, the regeneration device 1200 further comprises a central processing server 1236 configured to create a spectral plan for a given cable modem 1228-1, 1228-2, 1228-3, 1228-4 (which may be any of cable modems 1228-1, 1228-2, 1228-3, 1228-4, including the inbound cable modem 1228-1, 1228-2, 1228-3, 1228-4 and the outbound cable modem 1228-1, 1228-2, 12248-3, 1228-4) that is compatible with the given cable modem 1228-1, 1228-2, 1228-3, 1228-4 on a per customer premises basis and to isolate the spectral plan of the given cable modem 1228-1, 1228-2, 1228-3, 1228-4 from a coax line spectral plan. In one example embodiment, each tap modulator 1240-1, 1240-2, 1240-3, 1240-4 and each tap demodulator 1224-1, 1224-2, 1224-3, 1224-4 comprises a data port and wherein the tap modulators 1240-1, 1240-2, 1240-3, 1240-4 and the tap demodulators 1224-1, 1224-2, 1224-3, 1224-4 are configurable to individually enable and disable each data port of the regeneration device 1200.

In one example embodiment, data designated in a header to be routed to a first given cable modem 1228-1, 1228-2, 1228-3, 1228-4 (which may be any of cable modems 1228-1, 1228-2, 1228-3, 1228-4, including the inbound cable modem 1228-1, 1228-2, 1228-3, 1228-4 and the outbound cable modem 1228-1, 1228-2, 12248-3, 1228-4) residing closer to the regeneration device 1200 is mapped by the mapping engine 1204 to a higher frequency signal than data designated in the header to be routed to a second given cable modem 1228-1, 1228-2, 1228-3, 1228-4 (which may be any of cable modems 1228-1, 1228-2, 1228-3, 1228-4, including the inbound cable modem 1228-1, 1228-2, 1228-3, 1228-4 and the outbound cable modem 1228-1, 1228-2, 12248-3, 1228-4) that is farther away from the regeneration device 1200. In one example embodiment, one filter of the set of downstream filters 1244 and the set of upstream filters 1220 is configurable to filter data designated in the header to be routed to the outbound cable modem 1228-1, 1228-2, 1228-3, 1228-4 subtended from the regeneration device 1200 and send the data designated in the header to be routed to the outbound cable modem 1228-1, 1228-2, 1228-3, 1228-4 subtended from the regeneration device 1200 to the mapping engine 1204; one of the upstream demodulators 1216-1, 1216-2 and the downstream demodulators 1248-1, 1248-2 is configurable to demodulate the data designated in the header to be routed to the outbound cable modem 1228-1, 1228-2, 1228-3, 1228-4 subtended from the regeneration device 1200; the mapping engine 1204 is configurable to route the data designated in the header to be routed to the outbound cable modem 1228-1, 1228-2, 1228-3, 1228-4 subtended from the regeneration device 1200 to a specified port; a corresponding tap modulator 1240-1, 1240-2, 1240-3, 1240-4 is configurable to modulate the data designated in the header to be routed to the outbound cable modem 1228-1, 1228-2, 1228-3, 1228-4 subtended from the regeneration device 1200; and the corresponding tap modulator 1240-1, 1240-2, 1240-3, 1240-4 is configurable to deliver the data designated in the header to be routed to the outbound cable modem 1228-1, 1228-2, 1228-3, 1228-4 subtended from the regeneration device 1200 to a specified destination address.

In one example embodiment, one filter of the set of downstream filters 1244 and the set of upstream filters 1220 is configurable to filter data designated in a header to be moved from one transmission group to another transmission group, wherein each transmission group comprises data channels of like data types, and the mapping engine 1204 is configurable to remap the data designated in the header to be moved from one transmission group to another transmission group. In one example embodiment, one filter of the set of downstream filters 1244 and the set of upstream filters 1220 is configurable to filter data having a signal-to-noise ratio (SNR) that is insufficient to successfully transfer data and the mapping engine 1204 is configurable to map the data having the signal-to-noise ratio (SNR) that is insufficient to successfully transfer data for regeneration to an appropriate signal level and SNR that is sufficient to transfer the data. In one example embodiment, one filter of the set of downstream filters 1244 and the set of upstream filters 1220 is configurable to filter data having a signal-to-noise ratio (SNR) that is sufficient to successfully transfer data and to route the data having a signal-to-noise ratio (SNR) that is sufficient to successfully transfer data to bypass the mapping engine 1204.

In one example embodiment, the regeneration device 1200 further comprises a central processing server 1236, wherein the mapping engine 1204, the set of upstream filters 1220, the set of upstream demodulators 1216-1, 1216-2, the set of upstream modulators 1212-1, 1212-2, the upstream aggregator 1208, the set of tap demodulators 1224-1, 1224-2, 1224-3, 1224-4, and the set of tap modulators 1240-1, 1240-2, 1240-3, 1240-4 are coupled to and configured by the central processing server 1236. In one example embodiment, one tap demodulator of the set of tap demodulators 1224-1, 1224-2, 1224-3, 1224-4, one tap modulator of the set of tap modulators 1240-1, 1240-2, 1240-3, 1240-4, and the mapping engine 1204 are configurable to deliver peer-to-peer network traffic. In one example embodiment, the mapping engine 1204 is configurable to dynamically shift a location of an upstream/downstream spectrum split based on an identified traffic pattern. In one example embodiment, the regeneration device 1200 is configured to divide dedicated bandwidth of a spectral map into permanently dedicated bandwidth and non-permanently dedicated bandwidth, wherein the non-permanently dedicated bandwidth dynamically shrinks and expands based on a data load assigned to the permanently dedicated bandwidth.

In one example embodiment, a non-transitory computer readable medium comprising computer executable instructions which when executed by a computer cause the computer to perform the method of grouping data channels, at baseband, of like data types into corresponding transmission groups; and modulating, by one or more of the upstream modulators 1212-1, 1212-2, each transmission group at a frequency corresponding to a specific location in a spectral map.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
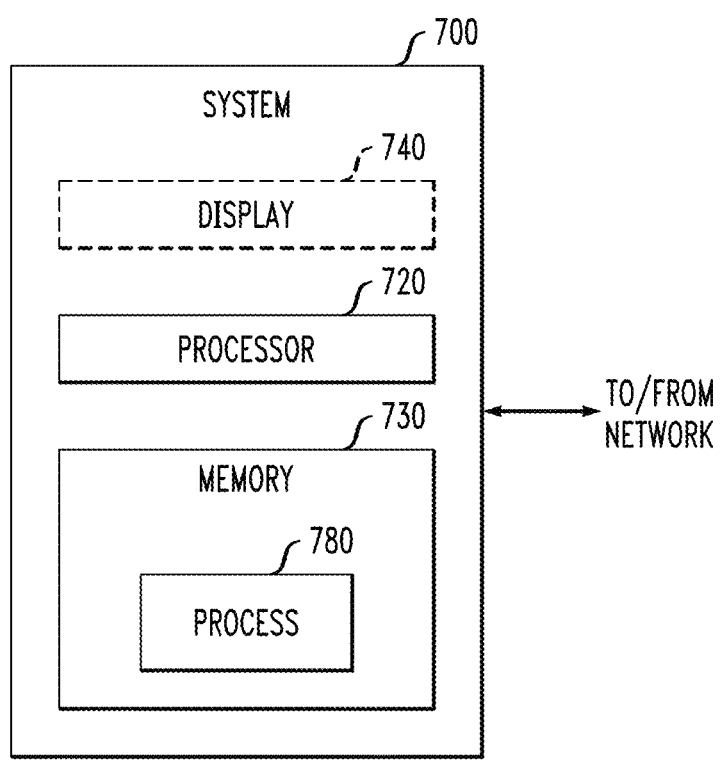
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 630 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A regeneration device comprising:
a mapping engine configured to rearrange a configuration of data on a plurality of data channels, the rearrangement being based on an accessing of a spectral map, the spectral map comprising a plurality of entries relating a given transmission group and a corresponding frequency;
a set of upstream filters, each upstream filter configured to pass one or more selected input radio frequency signals;
a set of upstream demodulators, an input of each upstream demodulator configurable to be coupled to a selected one of the upstream filters and an output of each upstream demodulator coupled to the mapping engine;
a set of upstream modulators, an input of each upstream modulator coupled to the mapping engine;
an upstream aggregator comprising one or more inputs and configured to aggregate a plurality of upstream-bound radio frequency signals, each input configurable to be coupled to at least one selected upstream filter of the set of upstream filters and a selected upstream modulator;
a set of tap demodulators, an output of each tap demodulator coupled to the mapping engine and configured to demodulate an inbound cable modem radio frequency signal from a corresponding inbound cable modem; and
a set of tap modulators, an input of each tap modulator coupled to the mapping engine and configured to modulate an outbound cable modem radio frequency signal for a corresponding outbound cable modem.

2. The regeneration device of claim 1, further comprising:
a set of downstream filters, each downstream filter configured to pass one or more selected downstream input radio frequency signals;
a set of downstream demodulators, an input of each downstream demodulator configurable to be coupled to a selected one of the downstream filters and an output of each downstream demodulator coupled to the mapping engine;
a set of downstream modulators, an input of each downstream modulator coupled to the mapping engine; and
a downstream aggregator comprising one or more inputs and configured to aggregate a plurality of downstream-bound radio frequency signals, each input configurable to be coupled to at least one selected downstream filter of the set of downstream filters and a selected downstream modulator.

3. The regeneration device of claim 1, the mapping engine further configured to:
group the data channels, at baseband, of like data types into corresponding transmission groups; and
modulate, by one or more of the upstream modulators, each transmission group at a frequency corresponding to a specific location in the spectral map.

4. The regeneration device of claim 2, wherein one or more data streams that require one or more of low latency and low jitter are mapped, by the mapping engine, to lower frequency spectrum of the spectral map than a frequency spectrum of the spectral map used for latency-tolerant and jitter-tolerant data channels.

5. The regeneration device of claim 1, wherein one filter of the set of downstream filters and the set of upstream filters is configurable to bypass regeneration for lower spectrum signals transporting low latency, low jitter data; and one filter of the set of downstream filters and the set of upstream filters is configurable to route higher spectrum signals transporting latency-tolerant and jitter-tolerant data channels for regeneration via the mapping engine.

6. The regeneration device of claim 1, the mapping engine further configured to pre-allocate time and frequency assignments to reduce signal jitter.

7. The regeneration device of claim 1, wherein at least one of the tap modulators is configurable to adjust a gain of an output signal in one or more of in a digital domain and in an analog domain.

8. The regeneration device of claim 1, wherein at least one of the tap modulators is configurable to receive an instruction to adjust a gain of an output signal level of a selected tap modulator.

9. The regeneration device of claim 1, the regeneration device further comprising a central processing server configured to create a spectral plan for a given cable modem that is compatible with the given cable modem on a per customer premises basis and to isolate the spectral plan of the given cable modem from a coax line spectral plan.

10. The regeneration device of claim 1, wherein each tap modulator and each tap demodulator comprise a data port and wherein the tap modulators and the tap demodulators are configurable to individually enable and disable each data port of the regeneration device.

11. The regeneration device of claim 1, wherein data designated in a header to be routed to a first given cable modem residing closer to the regeneration device is mapped by the mapping engine to a higher frequency signal than data designated in the header to be routed to a second given cable modem that is farther away from the regeneration device.

12. The regeneration device of claim 1, wherein:
one filter of the set of downstream filters and the set of upstream filters is configurable to filter data designated in the header to be routed to the outbound cable modem subtended from the regeneration device and send the data designated in the header to be routed to the outbound cable modem subtended from the regeneration device to the mapping engine;
one of the upstream demodulators and the downstream demodulators is configurable to demodulate the data designated in the header to be routed to the outbound cable modem subtended from the regeneration device;
the mapping engine is configurable to route the data designated in the header to be routed to the outbound cable modem subtended from the regeneration device to a specified port;
a corresponding tap modulator is configurable to modulate the data designated in the header to be routed to the outbound cable modem subtended from the regeneration device; and
the corresponding tap modulator is configurable to deliver the data designated in the header to be routed to the outbound cable modem subtended from the regeneration device to a specified destination address.

13. The regeneration device of claim 1, wherein one filter of the set of downstream filters and the set of upstream filters is configurable to filter data designated in a header to be moved from one transmission group to another transmission group, wherein each transmission group comprises data channels of like data types, and the mapping engine is configurable to remap the data designated in the header to be moved from one transmission group to another transmission group.

14. The regeneration device of claim 1, wherein one filter of the set of downstream filters and the set of upstream filters is configurable to filter data having a signal-to-noise ratio (SNR) that is insufficient to successfully transfer data and the mapping engine is configurable to map the data having the signal-to-noise ratio (SNR) that is insufficient to successfully transfer data for regeneration to an appropriate signal level and SNR that is sufficient to transfer the data.

15. The regeneration device of claim 1, wherein one filter of the set of downstream filters and the set of upstream filters is configurable to filter data having a signal-to-noise ratio (SNR) that is sufficient to successfully transfer data and to route the data having a signal-to-noise ratio (SNR) that is sufficient to successfully transfer data to bypass the mapping engine.

16. The regeneration device of claim 1, the regeneration device further comprising a central processing server, wherein the mapping engine, the set of upstream filters, the set of upstream demodulators, the set of upstream modulators, the upstream aggregator, the set of tap demodulators, and the set of tap modulators are coupled to and configured by the central processing server.

17. The regeneration device of claim 1, wherein one tap demodulator of the set of tap demodulators, one tap modulator of the set of tap modulators, and the mapping engine are configurable to deliver peer-to-peer network traffic.

18. The regeneration device of claim 1, wherein the mapping engine is configurable to dynamically shift a location of an upstream/downstream spectrum split based on an identified traffic pattern.

19. The regeneration device of claim 1, wherein the regeneration device is configured to divide dedicated bandwidth of the spectral map into permanently dedicated bandwidth and non-permanently dedicated bandwidth, wherein the non-permanently dedicated bandwidth dynamically shrinks and expands based on a data load assigned to the permanently dedicated bandwidth.

20. A method comprising:
grouping data channels, at baseband, of like data types into corresponding transmission groups;
accessing a spectral map, the spectral map comprising a plurality of entries relating a given transmission group of the data channels of like data types and a corresponding frequency;
mapping, by a mapping engine, one or more data streams that require one or more of low latency and low jitter to lower frequency spectrum of the spectral map than a frequency spectrum of the spectral map used for latency-tolerant and jitter-tolerant data channels; and
modulating, by one or more upstream modulators, each transmission group at a specified frequency in accordance with a specific location in the spectral map that corresponds to the given transmission group of the data channels of like data types.

21. A method comprising:
grouping data channels, at baseband, of like data types into corresponding transmission groups;
accessing a spectral map, the spectral map comprising a plurality of entries relating a given transmission group of the data channels of like data types and a corresponding frequency;
configuring one filter of a set of downstream filters and a set of upstream filters to bypass regeneration for lower spectrum signals transporting low latency, low jitter data; and
configuring one filter of the set of downstream filters and the set of upstream filters to route higher spectrum signals transporting latency-tolerant and jitter-tolerant data channels for regeneration via a mapping engine; and
modulating, by one or more upstream modulators, each transmission group at a specified frequency in accordance with a specific location in the spectral map that corresponds to the given transmission group of the data channels of like data types.

22. A method comprising:
grouping data channels, at baseband, of like data types into corresponding transmission groups;
accessing a spectral map, the spectral map comprising a plurality of entries relating a given transmission group of the data channels of like data types and a corresponding frequency;
mapping data designated in a header to be routed to a cable modem residing closer to a regeneration device to a higher frequency signal than data designated in the header to be routed to a cable modem that is farther away from the regeneration device.

23. A method comprising:
grouping data channels, at baseband, of like data types into corresponding transmission groups;
accessing a spectral map, the spectral map comprising a plurality of entries relating a given transmission group of the data channels of like data types and a corresponding frequency;
configuring one filter of a set of downstream filters and a set of upstream filters to filter data designated in a header to be moved from one transmission group to another transmission group and configuring a mapping engine to remap the data designated in the header to be moved from one transmission group to another transmission group.

* * * * *